(12) United States Patent
Kim et al.

(10) Patent No.: US 10,693,699 B2
(45) Date of Patent: Jun. 23, 2020

(54) METHOD AND TERMINAL FOR TRANSMITTING SYNCHRONIZATION SIGNAL IN V2X COMMUNICATION

(71) Applicant: LG ELECTRONICS INC., Seoul (KR)

(72) Inventors: Youngtae Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 14 days.

(21) Appl. No.: 15/770,604

(22) PCT Filed: Nov. 4, 2016

(86) PCT No.: PCT/KR2016/012638
§ 371 (c)(1),
(2) Date: Apr. 24, 2018

(87) PCT Pub. No.: WO2017/078452
PCT Pub. Date: May 11, 2017

(65) Prior Publication Data
US 2018/0309612 A1 Oct. 25, 2018

Related U.S. Application Data

(60) Provisional application No. 62/251,667, filed on Nov. 5, 2015.

(51) Int. Cl.
*H04W 4/40* (2018.01)
*H04L 27/26* (2006.01)
(Continued)

(52) U.S. Cl.
CPC ...... *H04L 27/2656* (2013.01); *H04L 27/2613* (2013.01); *H04L 27/2692* (2013.01); *H04W 4/40* (2018.02); *H04W 52/02* (2013.01); *H04W 56/002* (2013.01); *H04L 27/2671* (2013.01); *H04L 27/2675* (2013.01);
(Continued)

(58) Field of Classification Search
CPC .................................................. H04L 27/2656
See application file for complete search history.

(56) References Cited

U.S. PATENT DOCUMENTS

2015/0043545 A1* 2/2015 Cheng ................... H04W 56/00
370/336
2016/0302152 A1* 10/2016 Morita .............. H04W 52/0212
(Continued)

FOREIGN PATENT DOCUMENTS

KR  10-2012-0042596 A    5/2012
KR      10-1338554 B1   12/2013
(Continued)

*Primary Examiner* — John D Blanton
(74) *Attorney, Agent, or Firm* — Birch, Stewart, Kolasch & Birch, LLP

(57) ABSTRACT

A method for transmitting a synchronization signal in vehicle-to-something (V2X) communication is presented. A terminal according to the present invention can determine whether to transmit a synchronization signal on the basis of the power capacity of the terminal. The terminal can reduce power consumption by transmitting the synchronization signal only within a window according to the power capacity.

10 Claims, 20 Drawing Sheets

(51) Int. Cl.
*H04W 56/00* (2009.01)
*H04W 52/02* (2009.01)

(52) U.S. Cl.
CPC .......... *H04L 27/2685* (2013.01); *Y02D 70/00* (2018.01); *Y02D 70/122* (2018.01); *Y02D 70/126* (2018.01); *Y02D 70/14* (2018.01); *Y02D 70/20* (2018.01)

(56) References Cited

U.S. PATENT DOCUMENTS

| | | | |
|---|---|---|---|
| 2017/0055233 A1* | 2/2017 | Takano | H04W 4/70 |
| 2017/0230923 A1* | 8/2017 | Huang | H04W 56/00 |
| 2018/0020365 A1* | 1/2018 | Xiong | H04W 74/0833 |
| 2018/0249429 A1* | 8/2018 | Zhang | H04W 52/18 |

FOREIGN PATENT DOCUMENTS

| | | |
|---|---|---|
| KR | 10-2014-0076411 A | 6/2014 |
| KR | 10-2014-0102986 A | 8/2014 |
| KR | 10-2015-0053687 A | 5/2015 |

* cited by examiner

METHOD AND TERMINAL FOR TRANSMITTING SYNCHRONIZATION SIGNAL IN V2X COMMUNICATION

CROSS REFERENCE TO RELATED APPLICATIONS

This application is the National Phase of PCT International Application No. PCT/KR2016/012638, filed on Nov. 4, 2016, which claims priority under 35 U.S.C. 119(e) to U.S. Provisional Application No. 62/251,667, filed on Nov. 5, 2015, all of which are hereby expressly incorporated by reference into the present application.

TECHNICAL FIELD

The present invention relates to a wireless communication system, and more particularly, to a method of transmitting a synchronization signal in a D2D (device-to-device) and/or V2X (vehicle-to-something) communication.

BACKGROUND ART

According to intelligent transportation systems (ITS), many ongoing efforts are made to research and develop methods for exchanging various informations such as real-time traffic information and/or safety warning between vehicles. For example, ongoing efforts are made to research and develop vehicle communications for a proximity service (ProSe) and a public warning system. A communication interface for a vehicle can be commonly called V2X (vehicle-to-x). V2X communication may be categorized into V2V (vehicle-to-vehicle) communication, V2P (vehicle-to-pedestrian) communication, and V2I (vehicle-to-infrastructure entity) communication. V2V communication may refer to communication between vehicles. V2P communication may refer to communication between a vehicle and a personally carried device (e.g., a handheld terminal of a pedestrian or a bicycle rider). And, V2I communication may refer to communication between a vehicle and a roadside unit (RSU). RSU may refer to a traffic infrastructure entity. For example, RSU may include an entity that transmits a speed notification. For V2X communication, a vehicle, an RSU and a handheld device may be equipped with a transceiver.

As describe above, V2X communication may be used to indicate warnings for various events such as safety and the like. For example, information on an event occurring on a vehicle or road may be notified to another vehicle or pedestrians through V2X communication. For example, information on a warning of a traffic accident, a road situation change, or an accident danger may be forwarded to another vehicle or pedestrian. For example, a pedestrian, who is adjacent to or crossing a road, can be informed of information on vehicle approach.

However, since a vehicle moves at higher speed than a pedestrian, the V2X communication may have relatively low reliability. For example, a phase may be sharply changed due to the Doppler effect. In addition, a channel state may also be changed rapidly due to vehicle movement. Hence, to cope with the rapidly changed channel state, a method capable of achieving high reliability of communication is required.

As mentioned in the foregoing description, it is important to synchronize devices with each other in consideration of high mobility in a V2X communication. In relation to this, it may be able to perform synchronization between devices based on a GPS (global positioning system). Yet, each of the devices can be synchronized based on a synchronization signal received from a base station or a different device at the same time. If UEs are not synchronized with each other, one UE may fail to receive a message transmitted/broadcasted by another UE.

The present invention is proposed to solve the above-described problems, and particularly, the invention discloses a method for ensuring stable communication in various types of communication including V2X communication.

DISCLOSURE OF THE INVENTION

Technical Task

A technical task of the present invention is to provide a method of transmitting a synchronization signal in a D2D and/or V2X communication and an apparatus therefor.

Technical Solution

To achieve these and other advantages and in accordance with the purpose of the present invention, as embodied and broadly described, according to one embodiment, a method of transmitting a synchronization signal, which is transmitted by a user equipment (UE) for V2X (vehicle-to-something) communication in a wireless communication system, includes the steps of determining a UE type based on power capability of the UE, if the UE corresponds to a first type UE, transmitting the synchronization signal according to a first period, and if the UE corresponds to a second type UE, transmitting the synchronization signal within a window on a time axis according to a second period. In this case, the first type UE includes a UE contained in a vehicle and the second type UE can include a handheld UE.

Preferably, the window can be configured to include reception timing or transmission timing of a message of the UE.

Preferably, a size of the window can be determined based on at least one selected from the group consisting of a type of the UE, a type of a target UE of the message, and a priority of the message.

Preferably, at least one selected from the group consisting of a size of the window, a start point of the window, the first period, and the second period can be configured by higher layer signaling.

Preferably, if the UE corresponds to the second type UE, the step of transmitting the synchronization signal within the window on the time axis can include the step of determining whether to transmit the synchronization signal based on the number of receiving a message or a probability at the time of receiving the message.

The probability can be configured by higher layer signaling or the message.

Preferably, the UE can be synchronized based on a GPS (global positioning system) or signaling from a base station.

To further achieve these and other advantages and in accordance with the purpose of the present invention, according to a different embodiment, a user equipment (UE) transmitting a synchronization signal for V2X (vehicle-to-something) communication in a wireless communication system includes a transceiver configured to transmit and receive a radio signal and a processor configured to control the transceiver, the processor configured to determine a UE type based on power capability of the UE, the processor, if the UE corresponds to a first type UE, configured to transmit the synchronization signal according to a first period, the processor, if the UE corresponds to a second type UE, configured to transmit the synchronization signal within a window on a time axis according to a second period. In this case, the first type UE includes a UE contained in a vehicle and the second type UE can include a handheld UE.

Advantageous Effects

According to embodiments of the present invention, it is able to prevent signaling overhead for transmitting a synchronization signal and a power loss in a D2D and/or V2X communication.

According to embodiments of the present invention, it is able to efficiently transmit a synchronization signal in a D2D and/or V2X communication.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention.

BEST MODE

Mode for Invention

Figure 1:
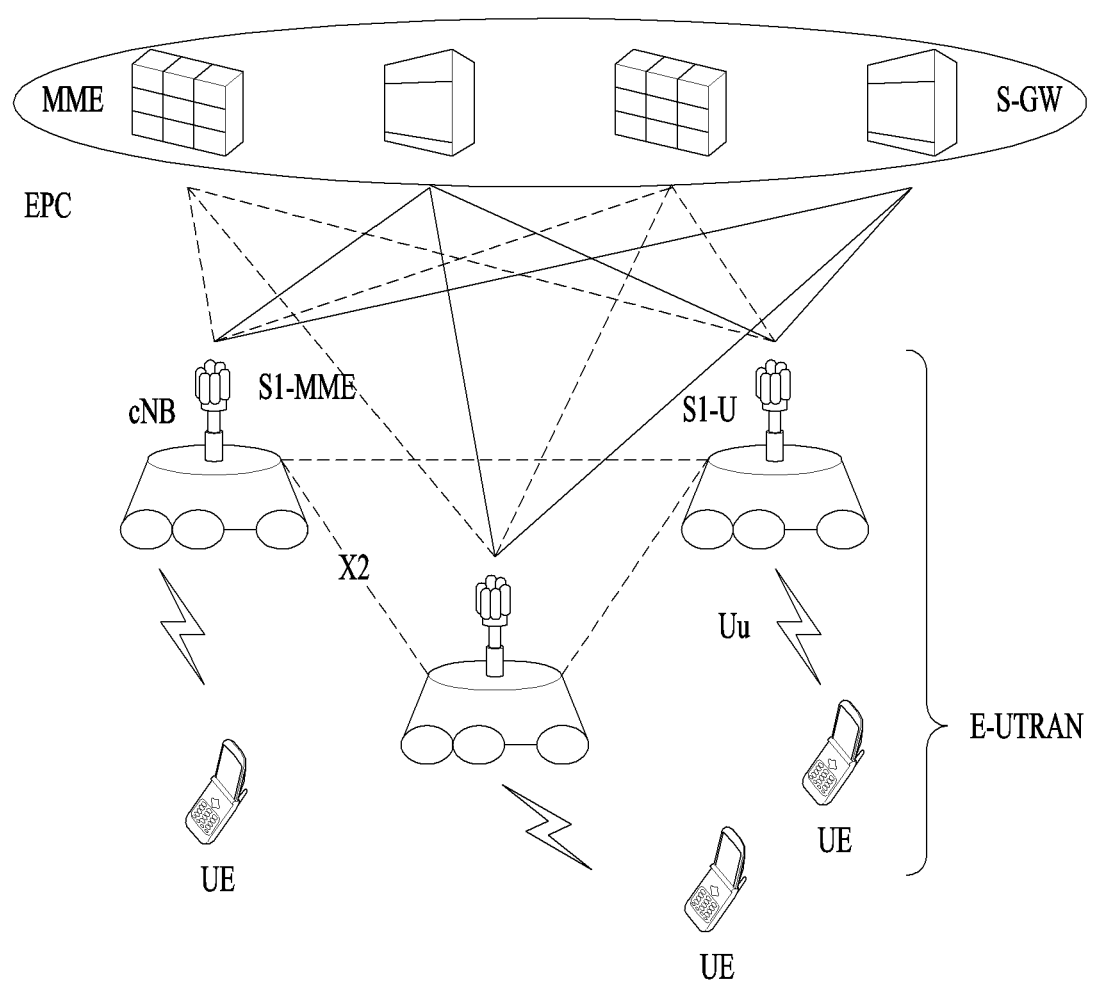
FIG. 1 shows system architecture of an LTE system which is an example of a wireless communication system.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

It will be apparent that various operations performed for communication with the user equipment UE in the network which includes a plurality of network nodes along with the base station may be performed by the base station BS or network nodes other than the base station BS. At this time, the base station BS may be replaced with terms such as a fixed station, Node B, eNode B (eNB), and an access point (AP). A relay node may be replaced with terms such as a relay node (RN) and a relay station (RS). Also, a terminal may be replaced with terms such as a user equipment (UE), a mobile station (MS), a mobile subscriber station (MSS), and a subscriber station (SS).

Specific terminologies hereinafter used in the embodiments of the present invention are provided to assist understanding of the present invention, and various modifications may be made in the specific terminologies within the range that they do not depart from technical spirits of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention may be supported by standard documents disclosed in at least one of wireless access systems, i.e., IEEE 802 system, 3GPP system, 3GPP LTE system, 3GPP LTE, 3GPP LTE-A (LTE-Advanced) system, and 3GPP2 system. Namely, among embodiments of the present invention, apparent steps or parts, which are not described to clarify technical spirits of the present invention, may be supported by the above documents. Also, all terminologies disclosed herein may be described by the above standard documents.

The following technology may be used for various wireless access systems such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as universal terrestrial radio access (UTRA) or CDMA2000.

The TDMA may be implemented by the radio technology such as global system for mobile communications (GSM)/ general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) communication system is a part of an evolved UMTS (E-UMTS) that uses E-UTRA, and uses OFDMA in a downlink while uses SC-FDMA in an uplink. LTE-advanced (LTE-A) is an evolved version of the 3GPP LTE system. WiMAX may be described by the IEEE 802.16e standard (WirelessMAN-OFDMA Reference System) and the advanced IEEE 802.16m standard (WirelessMAN-OFDMA Advanced system). Although the following description will be based on the 3GPP LTE system and the 3GPP LTE-A system to clarify description, it is to be understood that technical spirits of the present invention are not limited to the 3GPP LTE and the 3GPP LTE-A system.

LTE System Architecture

The architecture of an LTE system, which is an example of a wireless communication system to which the present invention is applicable, will be described with reference to FIG. 1. The LTE system is a mobile communication system that has evolved from UMTS. As shown in FIG. 1, the LTE system architecture may be broadly divided into an Evolved UMTS Terrestrial Radio Access Network (E-UTRAN) and an Evolved Packet Core (EPC). The E-UTRAN includes a user equipment (UE) and an Evolved NodeB (eNB). An interface between a UE and an eNB is referred to as a Uu interface, and an interface between eNBs is referred to as an X2 interface. The EPC includes a mobility management entity (MME) functioning as the control plane and a serving gateway (S-GW) functioning as the user plane. An interface between an eNB and an MME is referred to as an S1-MME interface, and an interface between an eNB and an S-GW is referred to as an S1-U interface, and the two interfaces may also be called an S1 interface.

Figure 2:
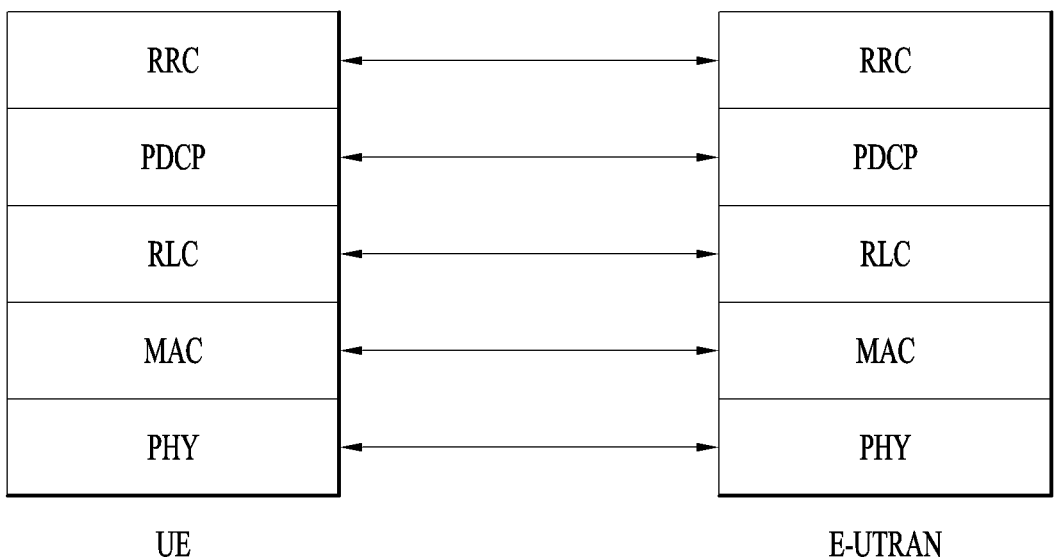
FIG. 2 illustrates a control plane of a radio protocol.
Figure 3:
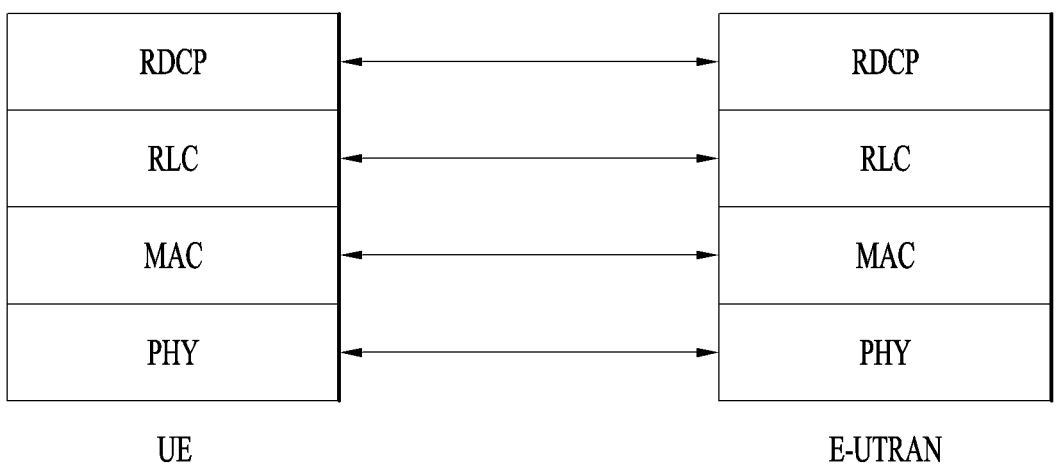
FIG. 3 illustrates a user plane of a radio protocol.

A radio interface protocol is defined in the Uu interface which is a radio section, wherein the radio interface protocol is horizontally comprised of a physical layer, a data link layer and a network layer, and vertically divided into a user plane for user data transmission and a control plane for signaling (control signal) transfer. Such a radio interface protocol may be typically classified into L1 (first layer) including a PHY which is a physical layer, L2 (second layer) including Media Access Control (MAC)/Radio Link Control (RLC)/Packet Data Convergence Protocol (PDCP) layers, and L3 (third layer) including a Radio Resource Control (RRC) layer as illustrated in FIGS. 2 and 3, based on the three lower layers of the Open System Interconnection (OSI) reference model widely known in the field of communication systems. These layers exist as a pair in the UE and E-UTRAN, and are responsible for data transmission of the Uu interface.

Hereinafter, each layer of a radio protocol shown in FIGS. 2 and 3 is described. FIG. 2 illustrates a control plane of a radio protocol, and FIG. 3 illustrates a user plane of a radio protocol.

The physical (PHY) layer serving as the first layer (L1) provides an information transfer service for a higher layer using a physical channel. The PHY layer is connected to the Media Access Control (MAC) layer serving as a higher layer over a transport channel. Through the transport channel, data is transferred from the MAC layer to the physical layer and vice versa. In this case, the transport channel is broadly divided into a dedicated transport channel and a common transport channel depending on whether or not the channel is shared. In addition, data is transferred between different PHY layers, i.e., between a PHY layer of a transmitter and a PHY layer of a receiver over a physical channel using radio resources.

There are various layers in the second layer. The MAC layer serves to map various logical channels to various transport channels and to perform logical channel multiplexing of mapping a plurality of logical channels to one transport channel. The MAC layer is connected to the Radio Link Control (RLC) layer, which is a higher layer, through a logical channel. The logical channel is broadly divided into a control channel for transmitting information on the control plane and a traffic channel for transmitting information on the user plane according to the type of information to be transmitted.

The RLC layer of the L2 segments and concatenates data received from a higher layer to adjust the data size such that the data is suitable for a lower layer to transmit the data in a radio section. To ensure various QoS levels required by various radio bearers (RBs), the RLC layer provides three RLC modes, namely, Transparent Mode (TM), Unacknowledged Mode (UM), and Acknowledged Mode (AM). Particularly, the AM RLC performs a retransmission function using an Automatic Repeat and Request (ARQ) function so as to implement reliable data transmission.

In order to efficiently transmit IP packets such as IPv4 or IPv6 packets in a radio section having a narrow bandwidth, the packet data convergence protocol (PDCP) layer of the L2 performs header compression to reduce the size of an IP packet header containing relatively large and unnecessary control information. This makes it possible to transmit only necessary information in the header portion of the data, thereby increasing the transmission efficiency of the radio section. In the LTE system, the PDCP layer also performs a security function, which consists of a ciphering function to prevent a third party from intercepting data and an integrity protection function to prevent a third party from manipulating data.

The Radio Resource Control (RRC) layer located at the top of the third layer (L3) is defined only in the control plane and is responsible for control of logical, transport, and physical channels in association with configuration, reconfiguration and release of Radio Bearers (RBs). Here, the RB refers to a logical path that the L1 and L2 of the radio protocol provide for data communication between the UE and the UTRAN. Generally, configuring an RB means that a radio protocol layer and channel characteristics needed to provide a specific service are defined and detailed parameters and operation methods thereof are configured. The RB is divided into a Signaling RB (SRB) and a Data RB (DRB). The SRB is used as a transmission passage of RRC messages in the control plane, and the DRB is used as a transmission passage of user data in the user plane.

LTE/LTE-A Resource Structure/Channel

Hereinafter, a DL radio frame structure will be described with reference to FIGS. 4 and 5.

In a cellular OFDM wireless packet communication system, an uplink (UL)/downlink (DL) data packet is transmitted on a subframe-by-subframe basis, and one subframe is defined as a predetermined time interval including a plurality of OFDM symbols. 3GPP LTE supports a type-1 radio frame structure applicable to frequency division duplex (FDD) and a type-2 radio frame structure applicable to time division duplex (TDD).

Figure 4:
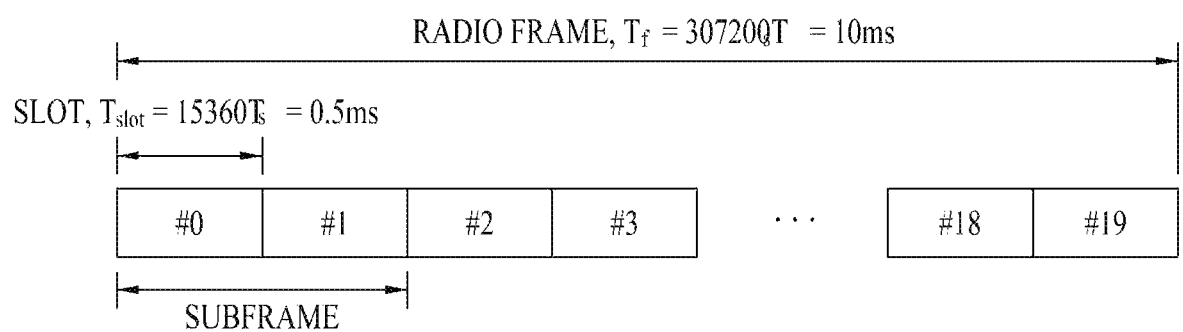
FIG. 4 illustrates the structure of a type-1 radio frame.

FIG. 4 illustrates the type-1 radio frame structure. A downlink radio frame is divided into 10 subframes. Each subframe is further divided into two slots in the time domain. A unit time during which one subframe is transmitted is defined as transmission time interval (TTI). For example, one subframe may be 1 ms in duration and one slot may be 0.5 ms in duration. A slot may include a plurality of orthogonal frequency division multiplexing (OFDM) symbols in the time domain and includes a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. A Resource Block (RB) is a resource allocation unit including a plurality of contiguous subcarriers in a slot.

Figure 5:
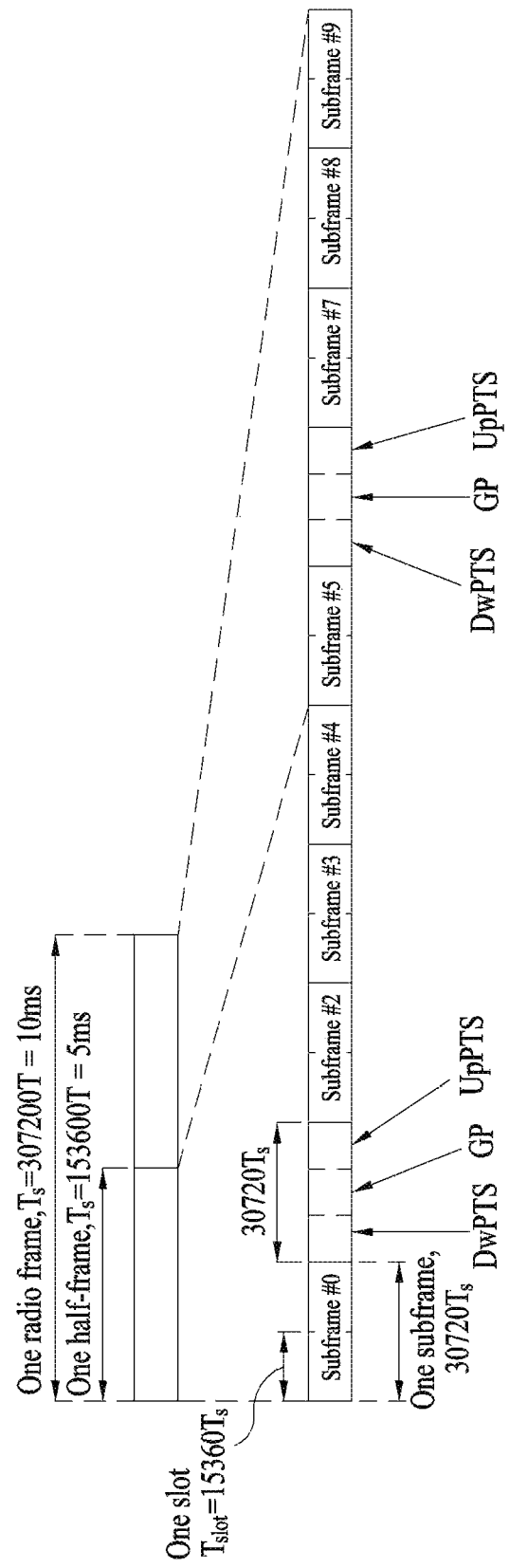
FIG. 5 illustrates the structure of a type-2 radio frame.

FIG. 5 illustrates the type-2 radio frame structure. The type-2 radio frame includes two half frames each having 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and uplink transmission synchronization in a UE. The GP is a period between a downlink and an uplink, for eliminating interference with the uplink caused by multi-path delay of a downlink signal. A subframe is composed of two slots irrespective of radio frame type.

The above-described radio frame structures are purely exemplary and thus it is to be noted that the number of subframes in a radio frame, the number of slots in a subframe, or the number of symbols in a slot may vary.

Figure 6:
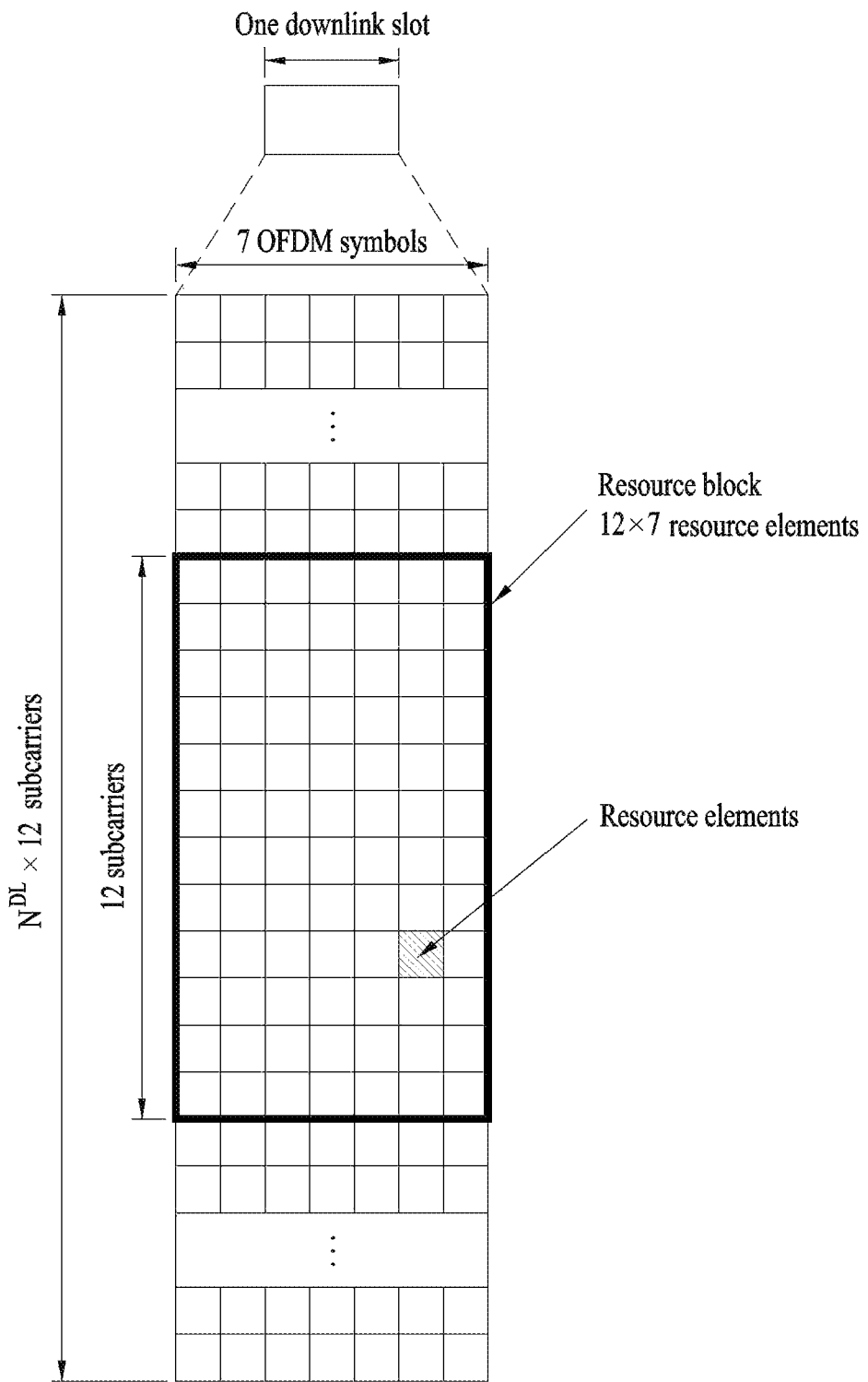
FIG. 6 illustrates a resource grid in a downlink slot.

FIG. 6 illustrates a resource grid for a downlink slot. A downlink slot includes 7 OFDM symbols in the time domain and an RB includes 12 subcarriers in the frequency domain, which does not limit the scope and spirit of the present invention. For example, a slot includes 7 OFDM symbols in the case of normal CP, whereas a slot includes 6 OFDM symbols in the case of extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 7:
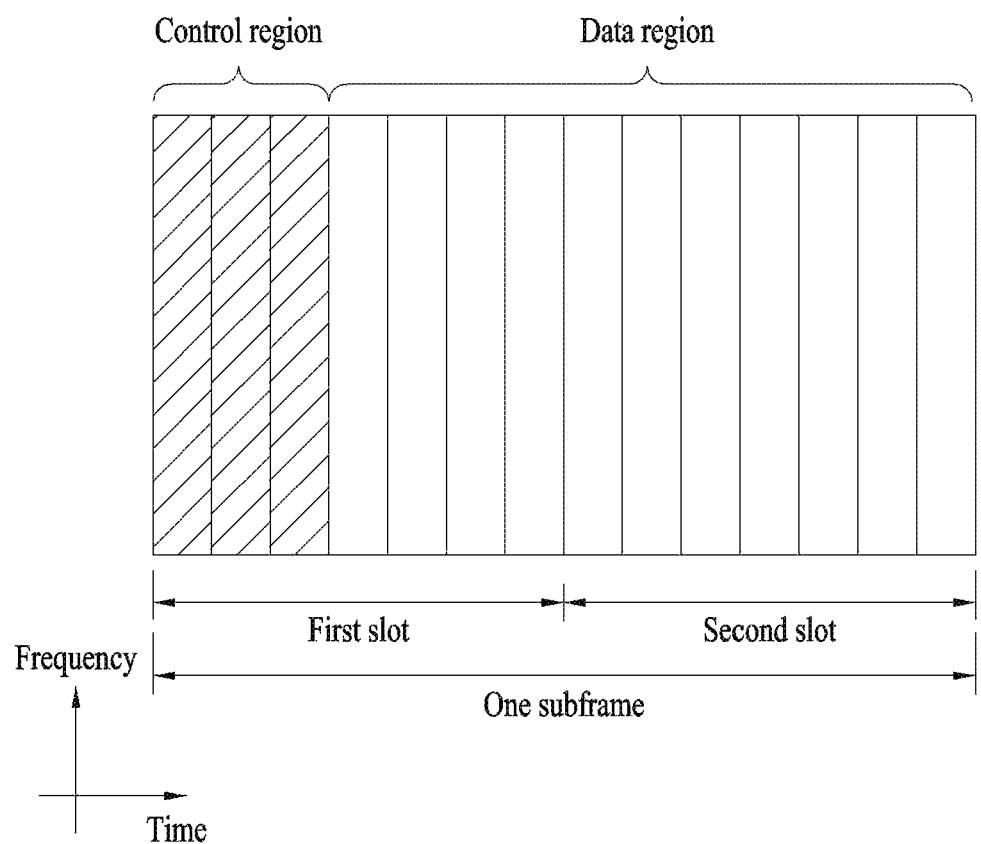
FIG. 7 illustrates a downlink subframe structure.

FIG. 7 illustrates a downlink subframe structure. Up to three OFDM symbols at the start of the first slot in a downlink subframe are used for a control region to which control channels are allocated and the other OFDM symbols of the downlink subframe are used for a data region to which a PDSCH is allocated. Downlink control channels used in 3GPP LTE include a physical control format indicator channel (PCFICH), a physical downlink control channel (PDCCH), and a physical hybrid automatic repeat request (ARQ) indicator channel (PHICH). The PCFICH is located in the first OFDM symbol of a subframe, carrying information about the number of OFDM symbols used for transmission of control channels in the subframe. The PHICH delivers a HARQ acknowledgment/negative acknowledgment (ACK/NACK) signal in response to an uplink transmission. Control information carried on the PDCCH is called downlink control information (DCI). The DCI includes uplink resource allocation information, downlink resource allocation information or an uplink transmit (Tx) power control command for an arbitrary UE group. The PDCCH delivers information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregation of one or more consecutive Control Channel Elements (CCEs). A CCE is a logical allocation unit used to provide a PDCCH at a coding rate based on the state of a radio channel. A CCE corresponds to a plurality of REs. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH carries a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 8:
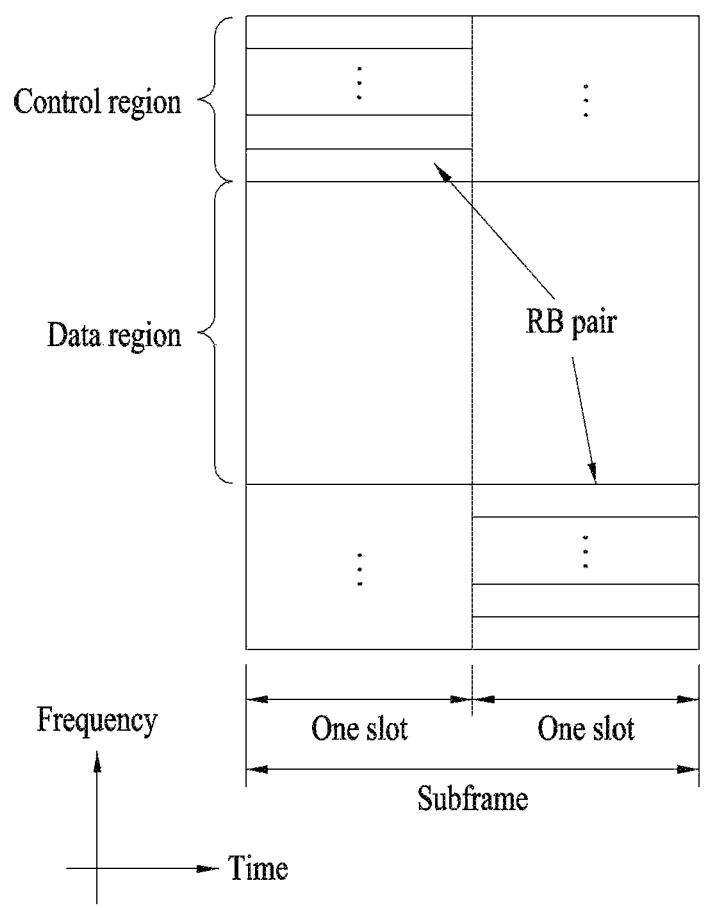
FIG. 8 illustrates an uplink subframe structure.

FIG. 8 illustrates an uplink subframe structure. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

To receive a signal from an eNB or transmit a signal to the eNB, a UE should match its time/frequency synchronization with that of the eNB. This is because only when the UE is synchronized with the eNB, the UE can determine time and frequency parameters required to perform demodulation of a DL signal and transmission of a UL signal at the exact time.

Figure 9:
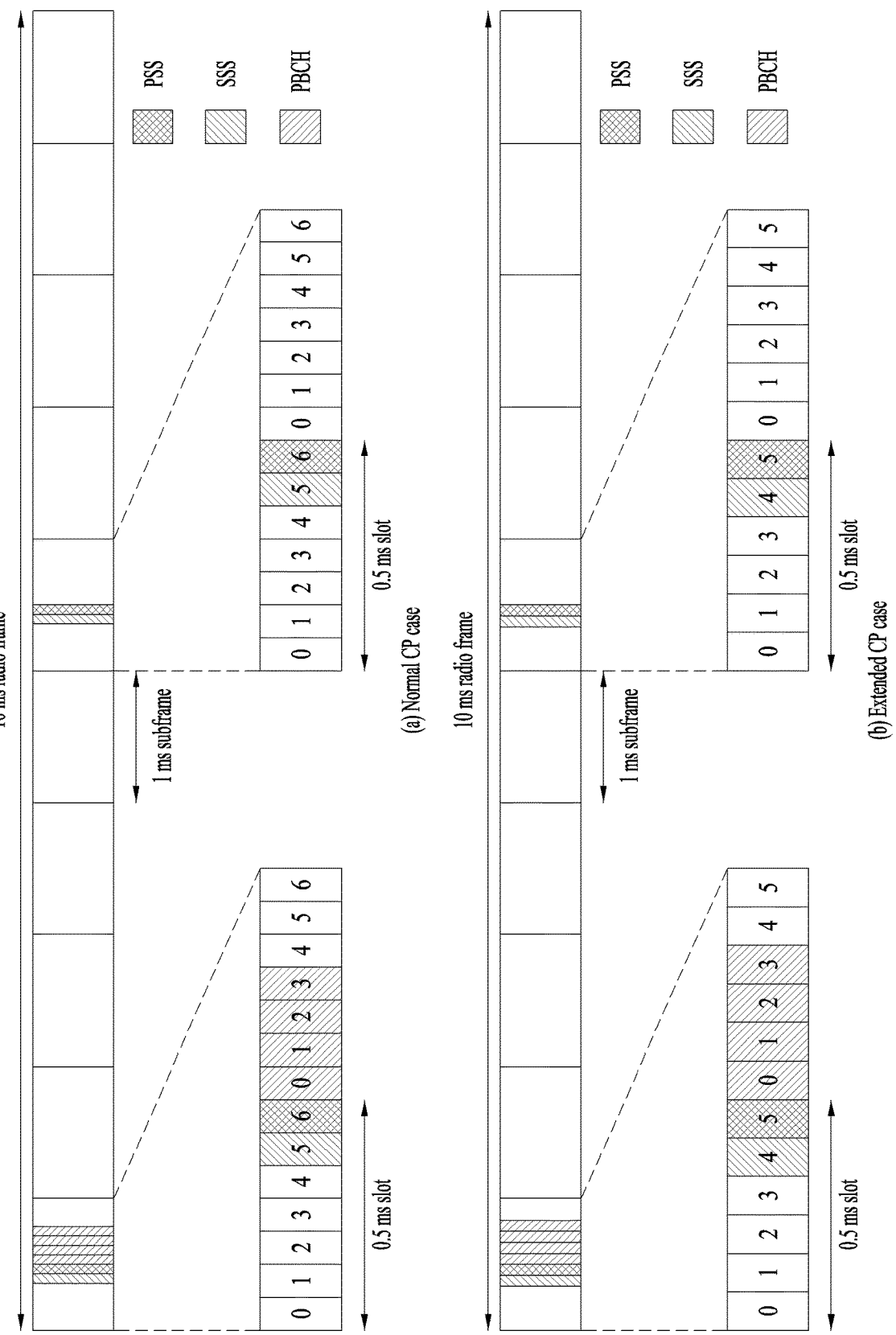
FIG. 9 illustrates a radio frame structure for transmission of a synchronization signal (SS).

FIG. 9 illustrates a radio frame structure for transmission of a synchronization signal (SS). Specifically, FIG. 9 illustrates a radio frame structure for transmission of an SS and a PBCH in frequency division duplex (FDD), wherein FIG. 9(a) illustrates transmission locations of an SS and a PBCH in a radio frame configured as a normal cyclic prefix (CP) and FIG. 9(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g. a primary synchronization signal (PSS) and a secondary synchronization signal (SSS), from the eNB and obtain information such as a cell identity (ID).

The SS will be described in detail with reference to FIG. 9. The SS is categorized as a PSS and an SSS. The PSS is used to acquire time-domain synchronization and/or frequency-domain synchronization such as OFDM symbol synchronization, slot synchronization, etc. The SSS is used to acquire frame synchronization, a cell group ID, and/or a cell's CP configuration (i.e. information indicating whether a normal CP or an extended is used). Referring to FIG. 9, the PSS and the SSS are respectively transmitted through two OFDM symbols in each radio frame. Specifically, the SS is transmitted in a first slot in each of subframe 0 and subframe 5 in consideration of a GSM (global system for mobile communication) frame length of 4.6 ms for facilitation of an inter-radio access technology (inter-RAT) measurement. In particular, the PSS is transmitted in a last OFDM symbol in each of the first slot of subframe 0 and the first slot of subframe 5. In addition, the SSS is transmitted in the second last OFDM symbol in each of the first slot of subframe 0 and the first slot of subframe 5. Boundaries of the corresponding radio frame may be detected through the SSS. The PSS is transmitted in the last OFDM symbol of the corresponding slot and the SSS is transmitted in the OFDM symbol immediately before the OFDM symbol in which the PSS is transmitted. According to a transmission diversity scheme for the SS, only a single antenna port is used. However, the transmission diversity scheme for the SS standards is not separately defined in the current standards. In other words, a single antenna port transmission scheme or a transmission scheme transparent to a UE (e.g. precoding vector switching (PVS), time switched transmit diversity (TSTD), or cyclic delay diversity (CDD)) can be adopted for transmission diversity of the SS.

The SS can represent total 504 unique physical layer cell IDs through combinations of 3 PSSs and 168 SSSs. In other words, the physical layer cell IDs are grouped into 168 physical layer cell ID groups each including three unique IDs so that each physical layer cell ID is a part of only one physical layer cell ID group. Thus, a physical layer cell ID $N_{ID}^{cell}$ is uniquely defined with a number $N_{ID}^{(1)}$ in the range of 0 to 167 indicating a physical layer cell ID group and a number $N_{ID}^{(2)}$ in the range of 0 to 2 indicating a physical layer ID in the physical layer cell ID group (i.e., $N_{ID}^{cell}=3N_{ID}^{(1)}+N_{ID}^{(2)}$). A UE can obtain one of the three unique physical layer IDs by detecting the PSS and then identify one of the 168 physical layer cell IDs, which are associated with the physical layer ID, by detecting the SSS. A Zadoff-Chu (ZC) sequence of length 63 is defined in a frequency domain and the sequence is used as the PSS. For example, the ZC sequence can be defined according to Equation 1 below.

$$d_u(n) = e^{-j\frac{\pi u n(n+1)}{N_{ZC}}}$$ [Equation 1]

In Equation 1, $N_{ZC}$ is set to 63 ($N_{ZC}=63$) and a sequence element corresponding to a DC subcarrier, n=31, is punctured.

The PSS is mapped to 6 RBs (=72 subcarriers) adjacent to a center frequency. Among the 72 subcarriers, 9 remaining subcarriers carry a value of 0 at all times and serve as elements facilitating filter design for performing synchronization. In order to define total three PSSs, u=24, u=29, and u=34 are used in Equation 1. Since u=24 and u=34 have a conjugate symmetry relation, two correlations may be simultaneously performed. In this case, the conjugate symmetry means the relationship in Equation 2 below.

$$d_u(n) = (-1)^n (d_{N_{ZC}-u}(n))^*, \text{ when } N_{ZC} \text{ is even number}$$

$$d_u(n) = (d_{N_{ZC}-u}(n))^*, \text{ when } N_{ZC} \text{ is odd number}$$ [Equation 2]

A one-shot correlator for u=29 and u=34 can be implemented using conjugate symmetry characteristics. Moreover, compared to a case without the conjugate symmetry, the total amount of calculation can be reduced by about 33.3%.

More specifically, a sequence d(n) used for the PSS can be generated from a frequency-domain ZC sequence according to Equation 3 below.

$$d_u(n) = \begin{cases} e^{-j\frac{\pi u n(n+1)}{63}} & n = 0, 1, \ldots, 30 \\ e^{-j\frac{\pi u(n+1)(n+2)}{63}} & n = 31, 32, \ldots, 61 \end{cases}$$ [Equation 3]

In Equation 3, a ZC root sequence index u can be given as shown in Table 1 below.

TABLE 1

| $N_{ID}^{(2)}$ | Root index u |
|---|---|
| 0 | 25 |
| 1 | 29 |
| 2 | 34 |

Referring to FIG. 9, since the PSS is transmitted every 5 ms, a UE may know that a corresponding subframe is one of subframe 0 and subframe 5 by detecting the PSS. However, the UE cannot know whether the subframe is subframe 0 or subframe 5. In other words, the UE cannot recognize boundaries of a radio frame only through the PSS. That is, frame synchronization cannot be obtained only from the PSS. The UE detects the boundaries of the radio frame by detecting an SSS which is transmitted twice in one radio frame with different sequences.

Figure 10:
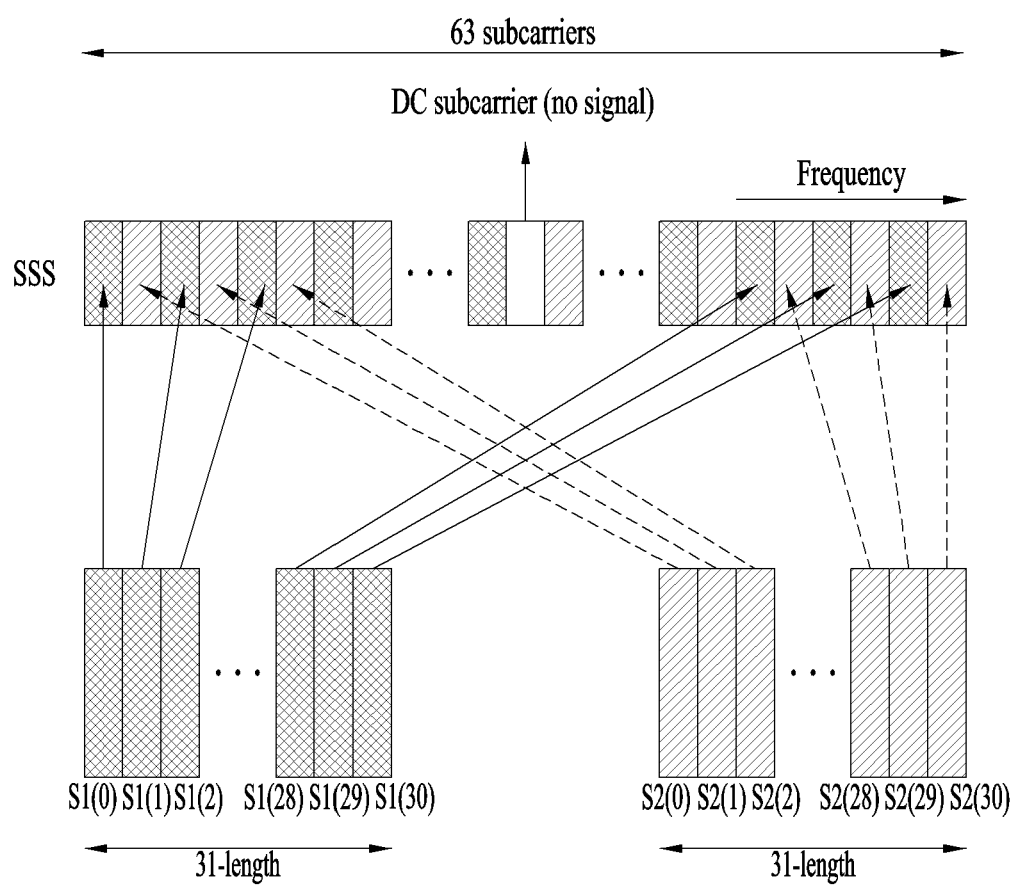
FIG. 10 is a diagram for explaining a scheme for generating a secondary synchronization signal (SSS).

FIG. 10 is a diagram for explaining a scheme of generating a secondary synchronization signal (SSS). Specifically, FIG. 10 illustrates a mapping relationship for mapping two sequences in a logical domain to a physical domain.

A sequence used for the SSS corresponds to an interleaved concatenation of two m-sequences each of length 31. The concatenated sequence is scrambled by a scrambling sequence given by the PSS. In this case, the m-sequence is a kind of a pseudo noise (PN) sequence.

Referring to FIG. 10, if two m-sequences used for generating an SSS code are denoted by S1 and S2 respectively, then two different PSS-based sequences S1 and S2 are scrambled into the SSS. In this case, S1 and S2 are scrambled by different sequences. A PSS-based scrambling code may be obtained by cyclically shifting an m-sequence generated from a polynomial of $x^5+x^3+1$. Depending on a PSS index, 6 sequences are generated by the cyclic shift of the m-sequence. Subsequently, S2 is scrambled by an S1-based scrambling code. The S1-based scrambling code may be obtained by cyclically shifting an m-sequence generated from a polynomial of $x^5+x^4+x^2+x^1+1$. Depending on an S1 index, 8 sequences are generated by the cyclic shift of the m-sequence. The SSS code is swapped every 5 ms, whereas the PSS-based scrambling code is not swapped. For example, assuming that an SSS of subframe 0 carries a cell group ID through a combination of (S1, S2), an SSS of subframe 5 carries a sequence swapped as (S2, S1). Thus, boundaries of a radio frame of 10 ms can be discerned. The SSS code used in this case is generated based on a polynomial of $x^5+x^2+1$. In addition, total 31 codes can be generated through different cyclic shifts of the m-sequence of length 31.

A combination of two m-sequences, each of which has length 31, used for defining the SSS differs in subframe 0 and subframe 5. Total 168 cell group IDs are represented according to a combination of the two m-sequences each of length 31. The m-sequences used as sequences for the SSS have a robust property in a frequency selective environment. In addition, since the m-sequences can be transformed by high-speed m-sequence transform that uses fast Hadamard transform, if the m-sequences are utilized for the SSS, the amount of calculation necessary for a UE to interpret the SSS can be reduced. Moreover, since the SSS is composed of two short codes, the amount of calculation performed by the UE can also be reduced.

Details of generation of the SSS is described hereinafter. Sequences of d(0), . . . , d(61) used for the SSS are an interleaved concatenation of two binary sequences, each of which has length 31. The concatenated sequence is scrambled by a sequence given by the PSS.

A combination of two sequences, each of which has length 31, used for defining the PSS can be differentiated in subframe 0 and subframe 5 according to Equation 4.

$$d(2n) = \begin{cases} s_0^{(m_0)}(n)c_0(n) & \text{in subframe 0} \\ s_1^{(m_1)}(n)c_0(n) & \text{in subframe 5} \end{cases}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

[Equation 4]

In Equation 4, $0 \leq n \leq 30$. Indices $m_0$ and $m_1$ are derived from the physical layer cell identity group $N_{ID}^{(1)}$ according to Equation 5.

$$m_0 = m' \mod 31$$

$$m_1 = (m_0 + \lfloor m'/31 \rfloor + 1) \mod 31$$

$$m' = N_{ID}^{(1)} + \frac{q(q+1)}{2}, q = \left\lfloor \frac{N_{ID}^{(1)} + q'(q'+1)/2}{30} \right\rfloor,$$

$$q' = \lfloor N_{ID}^{(1)}/30 \rfloor$$

[Equation 5]

The output in Equation 5 will be listed in Table 2 after Equation 11.

Two sequences $s_0^{(m_0)}(n)$ and $s_1^{(m_1)}(n)$ are defined as two different cyclic shifts of an m-sequence s(n) according to Equation 6.

$$s_0^{(m_0)}(n)=s((n+m_0) \mod 31)$$

$$s_1^{(m_1)}(n)=s((n+m_1) \mod 31)$$

[Equation 6]

In Equation 6, $s(i)=1-2x(i)$ (where $0 \leq i \leq 30$) is defined according to Equation 7 with initial conditions of $x(0)=0$, $x(1)=0$, $x(2)$, $x(3)=0$, and $x(4)=1$.

$$x(\bar{i}+5)=(x(\bar{i}+3)+x(\bar{i})) \mod 2, 0 \leq \bar{i} \leq 25$$

[Equation 7]

Two scrambling sequences $c_0(n)$ and $c_1(n)$ depend on the PSS and are defined by two different cyclic shifts of an m-sequence c(n) according to Equation 8.

$$c_0(n)=c((n+N_{ID}^{(2)}) \mod 31)$$

$$c_1(n)+c((n+N_{ID}^{(2)}+3) \mod 31)$$

[Equation 8]

In Equation 8, $N_{ID}^{(2)} \in \{0, 1, 2\}$ is a physical layer identity in the physical layer cell identity group $N_{ID}^{(1)}$ and $c(i)=1-2x(i)$ (where $0 \leq i \leq 30$) is defined according to Equation 9 with initial conditions of $x(0)=0$, $x(1)=0$, $x(2)$, $x(3)=0$, and $x(4)=1$.

$$x(\bar{i}+5)=(x(\bar{i}+3)+x(\bar{i})) \mod 2, 0 \leq \bar{i} \leq 25$$

[Equation 9]

Scrambling sequences $Z_1^{(m_0)}(n)$ and $Z_1^{(m_1)}(n)$ are defined by cyclic shifts of an m-sequence z(n) according to Equation 10.

$$z_1^{(m_0)}(n)=z((n+(m_0 \mod 8)) \mod 31)$$

$$z_1^{(m_1)}(n)=z((n+(m_1 \mod 8)) \mod 31)$$

[Equation 10]

In Equation 10, $m_0$ and $m_1$ are obtained from Table 2 after Equation 11 and $z(i)=1-2x(i)$ (where $0 \leq i \leq 30$) is defined according to Equation 11 with initial conditions of $x(0)=0$, $x(1)=0$, $x(2)$, $x(3)=0$, and $x(4)=1$.

$$x(\bar{i}+5)=(x(\bar{i}+4)+x(\bar{i}+2)+x(\bar{i}+1)+x(\bar{i})) \mod 2, 0 \leq \bar{i} \leq 25$$

[Equation 11]

TABLE 2

|   |   |   | 0 | 1 |   |   | 0 | 1 |   |   | 0 | 1 |   |   | 0 | 1 |
|---|---|---|---|---|---|---|---|---|---|---|---|---|---|---|---|---|
|   |   |   | 4 |   |   |   | 8 |   | 2 | 02 | 5 | 9 | 36 | 2 | 7 |
|   |   |   | 5 |   |   | 9 | 0 | 3 | 03 | 6 | 0 | 37 | 3 | 8 |
|   |   |   | 6 |   |   | 0 | 1 | 4 | 04 | 7 | 1 | 38 | 4 | 9 |
|   |   |   | 7 |   |   | 1 | 2 | 5 | 05 | 8 | 2 | 39 | 5 | 0 |
|   |   |   | 8 |   | 0 | 2 | 3 | 6 | 06 | 9 | 3 | 40 |   |   |
|   |   |   | 9 |   | 1 | 3 | 4 | 7 | 07 | 0 | 4 | 41 |   |   |
|   |   |   | 0 | 0 | 2 | 4 | 5 | 8 | 08 | 1 | 5 | 42 |   |   |
|   |   |   | 1 | 1 | 3 | 5 | 6 | 9 | 09 | 2 | 6 | 43 |   |   |
|   |   |   | 2 | 2 | 4 | 6 | 7 | 0 | 10 | 3 | 7 | 44 |   | 0 |
|   |   | 0 | 3 | 3 | 5 | 7 | 8 | 1 | 11 | 4 | 8 | 45 |   | 1 |
| 0 | 0 | 1 | 4 | 4 | 6 | 8 | 9 | 2 | 12 | 5 | 9 | 46 |   | 2 |
| 1 | 1 | 2 | 5 | 5 | 7 | 9 | 0 | 3 | 13 | 6 | 0 | 47 |   | 3 |
| 2 | 2 | 3 | 6 | 6 | 8 | 0 | 1 | 4 | 14 |   |   | 48 |   | 4 |
| 3 | 3 | 4 | 7 | 7 | 9 | 1 | 2 | 5 | 15 |   |   | 49 |   | 5 |
| 4 | 4 | 5 | 8 | 8 | 0 | 2 | 3 | 6 | 16 |   |   | 50 | 0 | 6 |
| 5 | 5 | 6 | 9 | 9 | 1 | 3 | 4 | 7 | 17 |   |   | 51 | 1 | 7 |
| 6 | 6 | 7 | 0 | 0 | 2 | 4 | 5 | 8 | 18 |   |   | 52 | 2 | 8 |
| 7 | 7 | 8 | 1 | 1 | 3 | 5 | 6 | 9 | 19 |   | 0 | 53 | 3 | 9 |
| 8 | 8 | 9 | 2 | 2 | 4 | 6 | 7 | 0 | 20 |   | 1 | 54 | 4 | 0 |
| 9 | 9 | 0 | 3 | 3 | 5 | 7 |   |   | 21 |   | 2 | 55 | 5 | 1 |
| 0 | 0 | 1 | 4 | 4 | 6 | 8 |   |   | 22 |   | 3 | 56 | 6 | 2 |
| 1 | 1 | 2 | 5 | 5 | 7 | 9 |   |   | 23 |   | 4 | 57 | 7 | 3 |
| 2 | 2 | 3 | 6 | 6 | 8 | 0 |   |   | 24 | 0 | 5 | 58 | 8 | 4 |
| 3 | 3 | 4 | 7 | 7 | 9 | 1 |   |   | 25 | 1 | 6 | 59 | 9 | 5 |
| 4 | 4 | 5 | 8 | 8 | 0 | 2 |   |   | 26 | 2 | 7 | 60 | 0 | 6 |
| 5 | 5 | 6 | 9 |   |   | 3 |   | 0 | 27 | 3 | 8 | 61 | 1 | 7 |
| 6 | 6 | 7 | 0 |   |   | 4 |   | 1 | 28 | 4 | 9 | 62 | 2 | 8 |
| 7 | 7 | 8 | 1 |   |   | 5 |   | 2 | 29 | 5 | 0 | 63 | 3 | 9 |
| 8 | 8 | 9 | 2 |   |   | 6 |   | 3 | 30 | 6 | 1 | 64 | 4 | 0 |
| 9 | 9 | 0 | 3 |   |   | 7 | 0 | 4 | 31 | 7 | 2 | 65 |   |   |
| 0 |   |   | 4 |   |   | 8 | 1 | 5 | 32 | 8 | 3 | 66 |   |   |
| 1 |   |   | 5 |   |   | 9 | 2 | 6 | 33 | 9 | 4 | 67 |   |   |
| 2 |   |   | 6 |   | 0 | 00 | 3 | 7 | 34 | 0 | 5 |   |   |   |
| 3 |   |   | 7 |   | 1 | 01 | 4 | 8 | 35 | 1 | 6 |   |   |   |

After determining time and frequency parameters required to demodulation of a DL signal and transmission of a UL signal at the exact time by performing a cell search procedure using the SSS, a UE can communicate with an eNB by receiving system information necessary for a system configuration of the UE from the eNB.

The system information is configured with a master information block (MIB) and system information blocks (SIBs). Each SIB includes a set of parameters which are functionally related to each other and is categorized as an MIB, SIB Type 1 (SIB1), SIB Type 2 (SIB2), and SIB3 to SIB8 according to the included parameters. The MIB includes most frequently transmitted parameters which are essential for a UE to initially access a network served by an eNB. The SIB1 includes not only information on time-domain scheduling for other SIBs but also parameters necessary to determine whether a specific cell is suitable for cell selection.

The UE may receive the MIB through a broadcast channel (e.g. a PBCH). The MIB includes a downlink system bandwidth (DL BW), a PHICH configuration, and a system frame number (SFN). Thus, the UE can explicitly know information on the DL BW, SFN, and PHICH configuration by receiving the PBCH. On the other hand, the UE may implicitly know information on the number of transmission antenna ports of the eNB. The information on the number of the transmission antennas of the eNB is implicitly signaled by masking (e.g. XOR operation) a sequence corresponding to the number of the transmission antennas to 16-bit CRC (cyclic redundancy check) used in detecting an error of the PBCH.

The PBCH is mapped to four subframes during 40 ms. The time of 40 ms is for blind detection and there is no explicit signaling for the time of 40 ms. In the time domain, the PBCH is transmitted in OFDM symbols 0 to 3 of slot 1 in subframe 0 (i.e., the second slot of subframe 0) of a radio frame.

In the frequency domain, PSS/SSS and PBCH are transmitted irrespective of an actual system bandwidth in total 6 RBs, i.e., 3 RBs in the left side and 3 RBs in the right side with reference to a DC subcarrier within a corresponding OFDM symbol. In other words, the PSS/SSS and the PBCH are transmitted only in 72 subcarriers. Therefore, a UE is configured to detect or decode the SS and the PBCH irrespective of a downlink transmission bandwidth configured for the UE.

After accessing the network served by the eNB by completing the initial cell search, the UE is able to obtain more detailed system information by receiving a PDCCH and a PDSCH according to information carried on the PDCCH. After performing the above-described procedure, the UE may perform PDCCH/PDSCH reception and PUSCH/PUCCH transmission as a general UL/DL signal transmission procedure.

Physical Broadcast Channel (PBCH) Overview

As a physical layer of the LTE system that constitutes a cell search procedure for a UE together with the PSS and SSS, the PBCH carries information such as the master information block (MIB) which all served UEs should know. That is, when obtaining synchronization from the PSS and SSS and detecting a cell identifier, a UE can receive a PBCH of the corresponding cell. This is because the PBCH is scrambled in accordance with the cell identifier.

To transmit the PBCH, different transmit diversity schemes are used depending on the number of eNB's transmit antennas. When there are two antennas, a space frequency block code (SFBC) scheme is used for the PBCH transmission. When there are four antennas, an SFBC+FSTD (frequency switching transmit diversity) scheme is used for the PBCH transmission. Thus, the UE should know the number of eNB's transmit antennas to receive the PBCH. To this end, an implicit signaling scheme is used in the LTE system. That is, the UE can perform blind detection of the number of eNB's transmit antenna using the fact that a signal varying depending on the number of antennas is masked after CRC is added to a BCH transport block.

Since the PBCH should be received by all the UEs irrespective of a transmission bandwidth, the PBCH is transmitted in 6 RBs located at the center of the system bandwidth and occupies first (or starting) 4 OFDM symbols of a second slot of a first subframe in a radio frame, which satisfies $n_f \mod 4=0$ and is consecutive to a synchronization signal (SS).

RS: Reference Signal

When a packet is transmitted in a mobile communication system, since the packet is transmitted via a radio channel, a signal may be distorted in the course of transmission. In order for a receiving end to correctly receive the distorted signal, the receiving end may correct the distortion of the transmitted signal as much as channel information by finding out the channel information. In order to find out the channel information, a signal known to both a transmitting end and the receiving end is transmitted and it may find out the channel information with the extent of distortion of the signal when the signal is received on a channel. The signal known to both the transmitting end and the receiving end is called a pilot signal or a reference signal. When wireless communication to which MIMO technique is applied is performed, a separate reference signal exists in each transmission antenna.

In a mobile communication system, a reference signal (RS) is mainly classified into two types according to a usage of the reference signal. The reference signal includes a reference signal used for obtaining channel information and a reference signal used for data demodulation. Since the former one is used for a UE to obtain the channel information in downlink, it is necessary for the RS to be transmitted by a wide band. Although a UE does not receive downlink data in a specific subframe, the UE should be able to receive and measure the RS. The RS used for obtaining the channel information can also be used for measuring handover and the like. The latter one corresponds to an RS transmitted to a corresponding resource together with a downlink resource when a base station transmits the downlink data. A UE can perform channel estimation by receiving the RS and may be then able to demodulate data. The reference signal used for data demodulation is transmitted in a region in which data is transmitted.

LTE system defines a downlink RS of two types for a unicast service. An RS is classified into a common RS (CRS) used for obtaining information on a channel state and measuring handover and the like and a UE-specific RS used for demodulating data. In LTE system, the UE-specific RS is used for modulating data only. On the contrary, the CRS is used not only for obtaining channel information but also for demodulating data. The CRS corresponds to a cell-specific signal and is transmitted in every subframe over a wide band.

In LTE-A system, a reference signal capable of supporting maximum 8 transmitting antennas is required. In order to support 8 transmitting antennas while backward compatibility with LTE system is maintained, it is necessary to additionally define RSs for maximum 8 transmission antennas in time-frequency domain in which a CRS defined in LTE is transmitted in every subframe over a whole band. If the RSs for the maximum 8 transmission antennas are added in LTE-A system using a scheme identical to the CRS of a legacy LTE, RS overhead becomes considerably big. Hence, an RS is newly designed in LTE-A to measure a channel for selecting MCS (Modulation and Coding Scheme), PMI (Precoding Matrix Indicator), and the like. The RS is mainly classified into two types including an RS (CSI-RS: channel state information-RS) and an RS (DM-RS) used for demodulating data. Unlike a legacy CRS, which is used for measuring a channel, handover and the like and demodulating data, the CSI-RS is mainly designed for the purpose of obtaining information on a channel. Since the CSI-RS is mainly transmitted to obtain information on a channel state, it is not necessary to transmit the CSI-RS in every subframe. In order to reduce overhead due to the CSI-RS, the CSI-RS is intermittently transmitted in time domain. For data demodulation, a DM-RS for a corresponding UE is transmitted. In particular, a DM-RS of a specific UE is transmitted in a region in which the specific UE is scheduled only, i.e., a time-frequency domain in which data is received by the specific UE.

Figure 11:
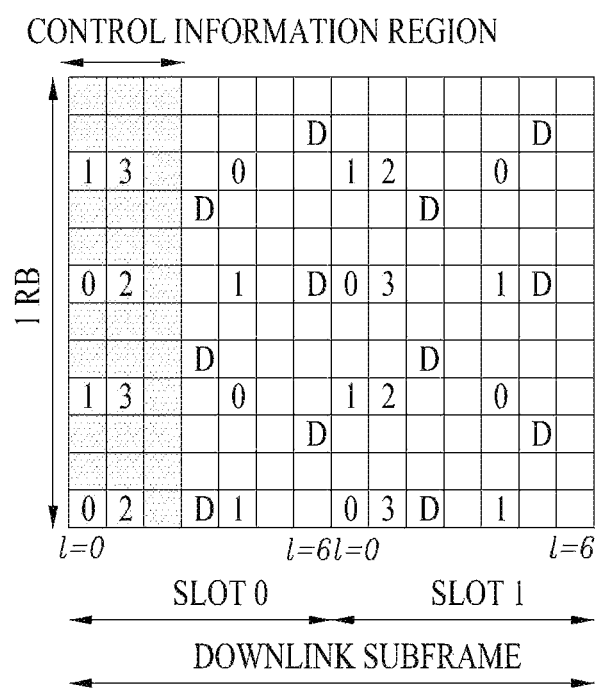
FIG. 11 is a diagram for a configuration of a downlink reference signal for a normal CP in LTE system supporting downlink transmission using 4 antennas.
Figure 12:
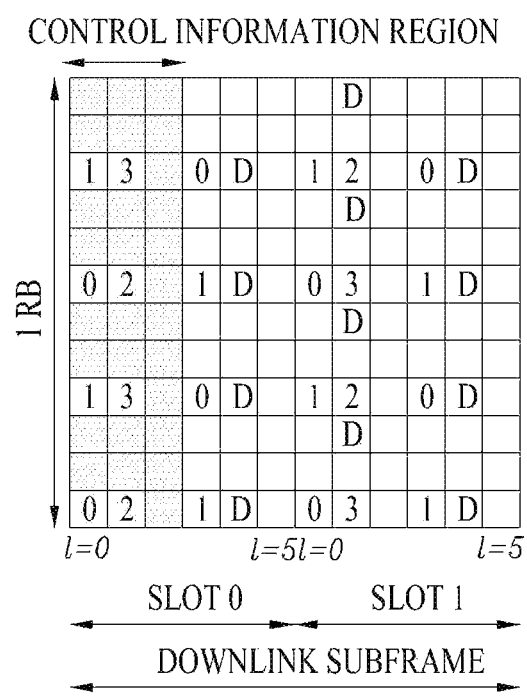
FIG. 12 is a diagram for a configuration of a downlink reference signal for an extended CP in LTE system supporting downlink transmission using 4 antennas.
Figure 13:
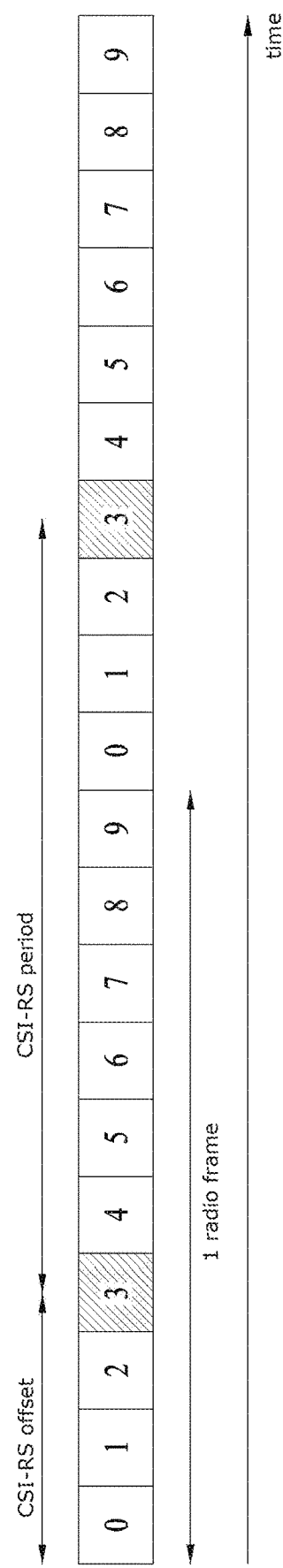
FIG. 13 is a diagram for an example of a periodic CSI-RS transmission scheme.

FIGS. 11 and 12 illustrate RS configurations in an LTE system supporting DL transmission through four antennas (4-Tx DL transmission). Specifically, FIG. 12 illustrates an RS configuration in the case of a normal CP and FIG. 13 illustrates an RS configuration in the case of an extended CP.

Referring to FIGS. 11 and 12, reference numerals 0 to 3 in grids denote cell-specific RSs, CRSs transmitted through antenna port 0 to antenna port 3, for channel measurement and data modulation. The CRSs may be transmitted to UEs across a control information region as well as a data information region.

Reference character D in grids denotes UE-specific RSs, Demodulation RSs (DMRSs). The DMRSs are transmitted in a data region, that is, on a PDSCH, supporting single-antenna port transmission. The existence or absence of a UE-specific RS, DMRS is indicated to a UE by higher-layer signaling. In FIGS. 11 and 12, the DMRSs are transmitted through antenna port 5. 3GPP TS 36.211 defines DMRSs for a total of eight antenna ports, antenna port 7 to antenna port 14.

For example, a rule of mapping an RS mapped to a resource block may follow following equations.

In case of a CRS, the CRS can be mapped according to equation 12.

$$k = 6m + (v + v_{shift}) \bmod 6 \quad \text{[Equation 12]}$$
$$l = \begin{cases} 0, N_{symb}^{DL} & \text{if } p \in \{0, 1\} \\ 1 & \text{if } p \in \{2, 3\} \end{cases}$$
$$m = 0, 1, \ldots, 2 \cdot N_{RB}^{DL} - 1$$
$$m' = m + N_{RB}^{max,DL} - N_{RB}^{DL}$$
$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$
$$v_{shift} = N_{ID}^{cell} \bmod 6$$

In case of a DRS (dedicated RS), the DRS can be mapped according to equation 13.

normal CP [Equation 13]
$$k = (k') \bmod N_{SC}^{RB} + N_{SC}^{RB} \cdot n_{PRB}$$
$$k' = \begin{cases} 4m' + v_{shift} & \text{if } l \in \{2, 3\} \\ 4m' + (2 + v_{shift}) \bmod 4 & \text{if } l \in \{5, 6\} \end{cases}$$

-continued
$$l = \begin{cases} 3 & l' = 0 \\ 6 & l' = 1 \\ 2 & l' = 2 \\ 5 & l' = 3 \end{cases}$$
$$l' = \begin{cases} 0, 1 & \text{if } n_s \bmod 2 = 0 \\ 2, 3 & \text{if } n_s \bmod 2 = 1 \end{cases}$$
$$m' = 0, 1, \ldots, 3N_{RB}^{PDSCH} - 1$$

Extended CP
$$k = (k') \bmod N_{SC}^{RB} + N_{SC}^{RB} \cdot n_{PRB}$$
$$k' = \begin{cases} 3m' + v_{shift} & \text{if } l = 4 \\ 3m' + (2 + v_{shift}) \bmod 3 & \text{if } l = 1 \end{cases}$$
$$l = \begin{cases} 4 & l' \in \{0, 2\} \\ 1 & l' = 1 \end{cases}$$
$$l' = \begin{cases} 0 & \text{if } n_s \bmod 2 = 0 \\ 1, 2 & \text{if } n_s \bmod 2 = 1 \end{cases}$$
$$m' = 0, 1, \ldots, 4N_{RB}^{PDSCH} - 1$$
$$v_{shift} = N_{ID}^{cell} \bmod 3$$

In equations 12 and 13, k indicates a subcarrier index and P indicates an antenna port index. And, $N_{DL}^{RB}$ indicates the number of resource blocks allocated to DL, $n_s$ indicates a slot index, and $N_{ID}^{cell}$ indicates a cell ID.

In LTE-A system, an eNB transmits a CSI-RS to all antenna ports. As mentioned in the foregoing description, a CSI-RS can be intermittently transmitted in a time axis. In particular, a CSI-RS can be periodically transmitted with an interval of integer multiple of a subframe. Or, a CSI-RS can be transmitted with a specific transmission pattern. In this case, the interval or the pattern used for transmitting a CSI-RS can be configured by an eNB. In order to measure a channel using a CSI-RS, a UE should be aware of such information as a transmission subframe index of the CSI-RS for each CSI-RS antenna port of a cell to which the UE belongs, a CSI-RS RE time-frequency position within a transmission subframe, a CSI-RS sequence, and the like.

In LTE-A system, a resource used for transmitting a CSI-RS to antenna ports different from each other should be orthogonal to each other. When an eNB transmits a CSI-RS to antenna ports different from each other, resources can be orthogonally allocated using FDM/TDM scheme in a manner of mapping a CSI-RS transmitted to each antenna port to REs different from each other. Or, a CSI-RS transmitted to antenna ports different from each other can be mapped to codes orthogonal to each other using a CDM scheme.

An example of a scheme periodically transmitting a CSI-RS is shown in FIG. 13. As shown in FIG. 13, a CSI-RS is transmitted with a period of 10 ms and a CSI-RS transmission offset corresponds to 3. An offset value may vary according to an eNB to enable CSI-RSs of many cells to be evenly distributed. In case of a CSI-RS transmitted with a period of 10 ms, an eNB may have 10 offset values ranging from 0 to 9. The offset value indicates a subframe index value where the eNB of a specific period actually starts to transmit a CSI-RS. If the eNB informs a UE of a period of a CSI-RS and an offset value, the UE measures the CSI-RS of the eNB at a corresponding position using the value and reports such information as CQI/PMI/RI and the like to the eNB. All of the aforementioned informations related to the CSI-RS correspond to cell-specific information.

Figure 14:
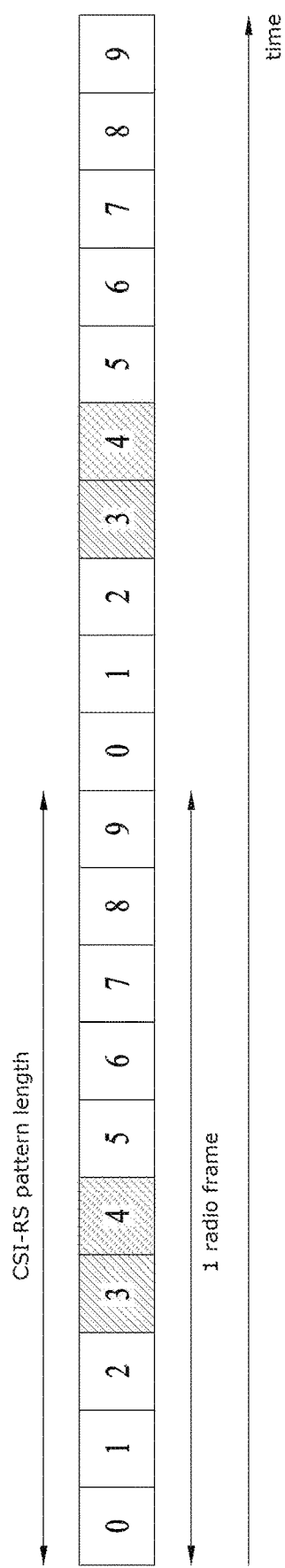
FIG. 14 is a diagram for an example of an aperiodic CSI-RS transmission scheme.

FIG. 14 shows an example of an aperiodic CSI-RS transmission scheme. Referring to FIG. 14, an eNB transmits a CSI-RS at subframe indexes 3 and 4. A transmission pattern includes 10 subframes. In each subframe, whether to transmit a CSI-RS can be designated by a bit indicator.

In general, an eNB is able to inform a UE of CSI-RS configuration by one of two schemes described in the following.

First of all, an eNB can transmit CSI-RS configuration using DBCH (dynamic broadcast channel) signaling that the eNB broadcasts information on CSI-RS configuration to UEs. In LTE system, when contents on system information are informed to UEs, the information is transmitted to the UEs via a BCH (broadcasting channel). Yet, if the contents are too much and the BCH is unable to carry all of the contents, the contents are transmitted using a scheme used for transmitting a general data. And, PDCCH of corresponding data is transmitted in a manner of being CRC-masked using SI-RNTI, i.e., system information RNTI instead of a specific UE ID. And, actual system information is transmitted in a PDSCH region together with a general unicast data. By doing so, all UEs in a cell decode PDCCH using the SI-RNTI, decode PDSCH indicated by the corresponding PDCCH and may be then able to obtain system information. This sort of broadcasting scheme may be called a DBCH (dynamic BCH) to differentiate from a general broadcasting scheme, i.e., PBCH (physical BCH). System information broadcasted in LTE system can be divided into two types. One is a master information block (MIB) transmitted on the PBCH and another one is a system information block (SIB) transmitted on PDSCH and then transmitted in a manner of being multiplexed with a general unicast data. It may be able to transmit VSI-RS configuration using SIB9, SIB10, or the like newly introduced in LTE-A.

An eNB can inform each UE of information on CSI-RS configuration using RRC (radio resource control) signaling. In the course of establishing a connection with the eNB via an initial access or handover of the UE, the eNB informs the UE of the CSI-RS configuration via RRC signaling. Or, an eNB may inform a UE of CSI-RS configuration via an RRC signaling message, which requires feedback based on CSI-RS measurement.

In the following, various embodiments for a UE to perform device to device communication (hereinafter, D2D communication, D2D direct communication, etc.) are explained. In explaining the D2D communication, 3GPP LTE/LTE-A is mainly explained as an example. Yet, the D2D communication can also be applied to a different communication system (e.g., IEEE 802.16, WiMAX, etc.).

D2D Communication Type

D2D communication can be classified into a network coordinated D2D communication type and an autonomous D2D communication type according to whether a D2D communication is performed by a control of a network. The network coordinated D2D communication type can be classified again into a type of transmitting data only by D2D (data only in D2D) and a type of performing an access control only by a network (connection control only in network) according to the extent of involvement of the network. For clarity, the type of transmitting data only by the D2D is called a 'network concentrated D2D communication type' and the type of performing access control only by the network is called a 'distributed D2D communication type' in the following.

According to the network concentrated D2D communication type, data is exchanged between D2D terminals only. An access control (connection control) and radio resource allocation (grant message) between the D2D terminals are performed by a network. The D2D terminals can transmit and receive data or specific control information using a radio resource allocated by the network. For instance, HARQ ACK/NACK feedback for the data reception between the D2D terminals or channel state information (CSI) is not directly exchanged between the D2D terminals. Instead, the feedback or the CSI can be transmitted to a different D2D terminal via the network. Specifically, when the network establishes a D2D link between the D2D terminals and allocates a radio resource to the established D2D link, a transmission D2D terminal and a reception D2D terminal can perform D2D communication using the allocated radio resource. In particular, according to the network concentrated D2D communication type, D2D communication between D2D terminals is controlled by the network and the D2D terminals can perform D2D communication using a radio resource allocated by the network.

A network according to the distributed D2D communication type performs a more limitative role compared to a network according to the network concentrated D2D communication type. Although the network in the distributed D2D communication type performs an access control between D2D terminals, radio resource allocation (grant message) between the D2D terminals can be autonomously occupied by the D2D terminals via contention without a help of the network. For instance, HARQ ACK/NACK feedback for the reception of data between the D2D terminals or channel state information can be directly exchanged between the D2D terminals without passing through the network.

As mentioned earlier in the foregoing example, D2D communication can be classified into the network concentrated D2D communication type and the distributed D2D communication type according to the extent of involvement of a network. In this case, a common characteristic between the network concentrated D2D communication type and the distributed D2D communication type is a D2D access control capable of being performed by the network.

Specifically, a network according to the network coordinated D2D communication type can establish a connection between D2D terminals in a manner of establishing a D2D link between the D2D terminals intending to perform D2D communication. In case of establishing the D2D link between the D2D terminals, the network can assign a physical D2D link identifier (LID) to the established D2D link. The physical D2D link ID can be used as an identifier for identifying each of a plurality of D2D links in case that there are a plurality of the D2D links among a plurality of D2D terminals.

Unlike the network concentrated type and the distributed D2D communication type, according to an autonomous D2D communication type, D2D terminals can freely perform D2D communication without a help of a network. In particular, unlike the network concentrated type and the distributed D2D communication type, an access control, occupation of a radio resource and the like can be autonomously performed by the D2D terminals in the autonomous D2D communication type. If necessary, the network may provide the D2D terminals with D2D channel information capable of being used in a corresponding cell.

Configuration of D2D Communication Link

For clarity, a terminal performing or capable of performing the D2D communication, which is a direct communication between terminals, is called a D2D terminal (D2D terminal). In the following description, a 'UE' may correspond to a D2D terminal. When it is necessary to distinguish a transmitting end from a receiving end, in case of performing the D2D communication, a D2D terminal transmitting or intending to transmit data to a different D2D terminal using a radio resource given to a D2D link is called a transmission D2D terminal. On the contrary, a terminal receiving or intending to receive data from the transmission D2D terminal is called a reception D2D terminal. If there exist a plurality of reception D2D terminals, which receive or intend to receive data from the transmission D2D terminal, a plurality of the reception D2D terminals can be distinguished from each other using a prefix such as 'first to N'. Moreover, for clarity, such a random node of a network as a base station configured to perform access control between D2D terminals or allocate a radio resource to a D2D link, a D2D server, an access/session management server and the like are commonly called a 'network' in the following description.

In order for a D2D terminal performing D2D communication to transmit data to a different D2D terminal via the D2D communication, it is necessary for the D2D to check whether or not D2D terminals capable of transmitting and receiving data are located near the D2D terminal. To this end, the D2D terminal performs D2D peer discovery. The D2D terminal performs D2D discovery within a discovery interval and all D2D terminals may share the discovery interval. The D2D terminal monitors logical channels of a discovery region within the discovery interval to receive D2D discovery signals transmitted by different D2D terminals. Having received the signals of the different D2D terminals, the D2D terminal makes a list of adjacent D2D terminals using the received signal. And, the D2D terminal broadcasts information (i.e., an identifier) of the D2D terminal within the discovery interval and the different D2D terminals receive the broadcasted D2D discovery signal. By doing so, the different D2D terminals are able to know that the D2D terminal exists within a range capable of performing D2D communication.

Information broadcasting for D2D discovery can be periodically performed. And, broadcasting timing can be determined in advance by a protocol and can be notified to D2D terminals. The D2D terminal can transmit/broadcast a signal during a part of the discovery interval. Each of the D2D terminals may monitor signals potentially transmitted by different D2D terminals during the rest of the D2D discovery interval.

For example, a D2D discovery signal may correspond to a beacon signal. And, D2D discovery intervals may include a plurality of symbols (e.g., OFDM symbols). A D2D terminal selects at least one symbol belonging to a D2D discovery interval to transmit/broadcast a D2D discovery signal. And, the D2D terminal may transmit a signal corresponding to a tone of the symbol selected by the D2D terminal.

After D2D UEs discovers each other through a D2D discovery process, the D2D UEs perform a connection establishment process. By doing so, one D2D UE can transmit traffic to the other D2D UE.

Figure 15:
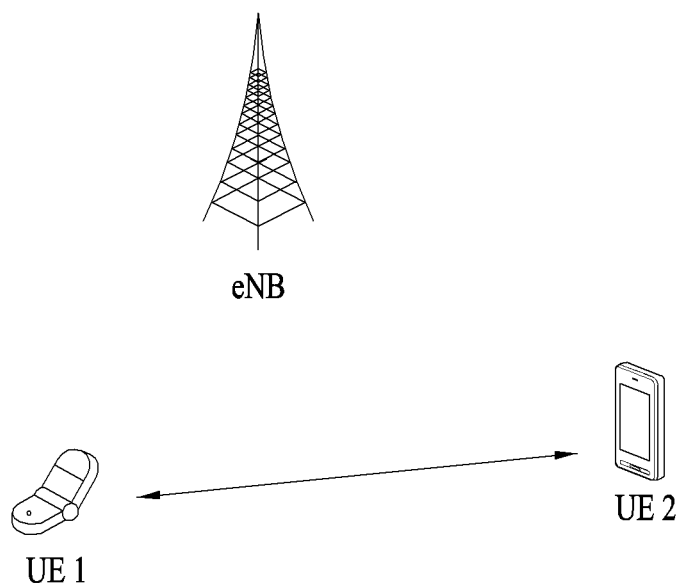
FIG. 15 is a diagram for a simplified D2D communication network.

FIG. 15 is a diagram for a simplified D2D communication network.

Referring to FIG. 15, D2D communication is performed between UEs (UE1 and UE2) supporting D2D communication. In general, a user equipment (UE) corresponds to a terminal of a user. If such a network device as an eNB (evolved Node B) transmits and receives a signal according to a communication scheme between the UEs UE1 and UE2), the eNB can be considered as a UE as well.

A UE1 selects a resource unit corresponding to a specific resource from a resource pool corresponding to a set of resources and the UE1 transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission.

Figure 16:
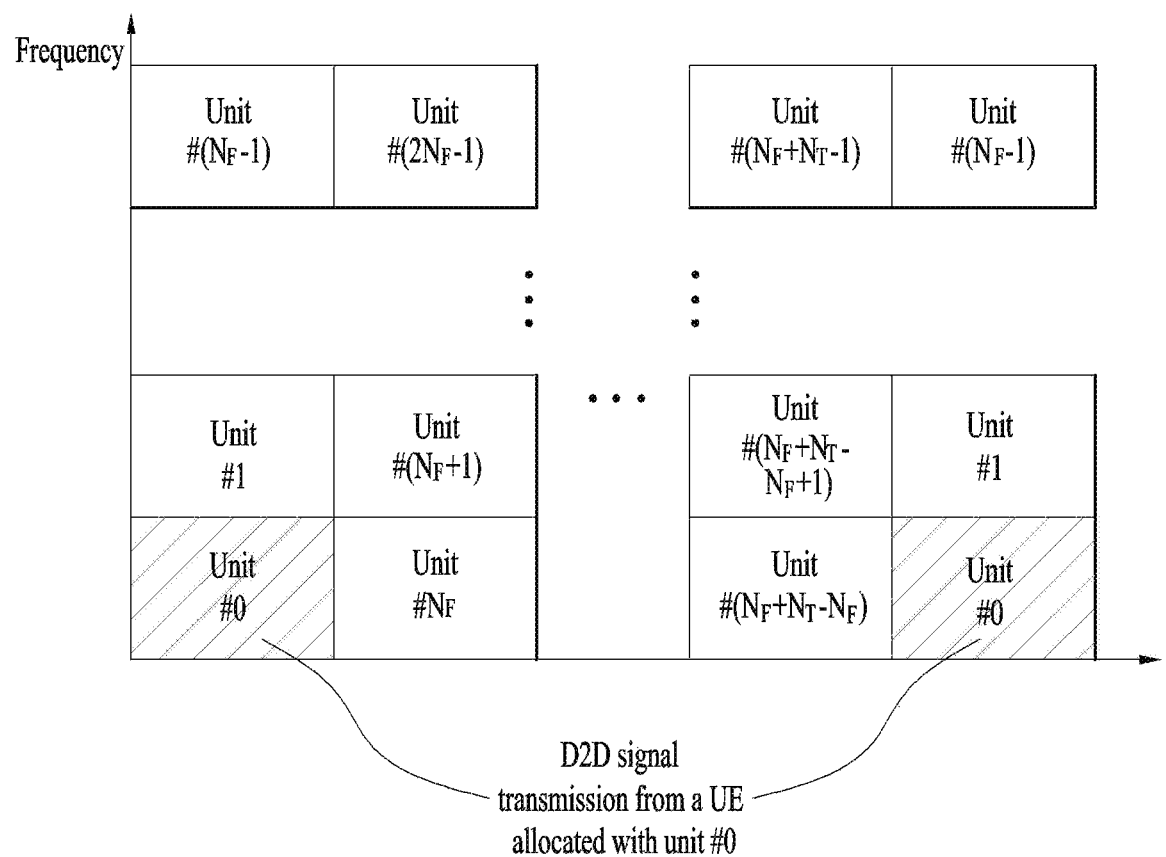
FIG. 16 is a diagram for a configuration of a resource unit according to an example.

FIG. 16 is a diagram for a configuration of a resource unit according to an example.

In FIG. 16, a vertical axis corresponds to a frequency resource and a horizontal axis corresponds to a time resource. A radio resource is divided into the $N_T$ number of resource units in a time axis to configure the $N_T$ number of subframes. And, a frequency resource is divided into the $N_F$ number of resource units in a subframe. In particular, one subframe can include the $N_T$ number of symbols. In particular, it is able to define $N_F*N_T$ number of resource units in total.

A D2D transmission resource (unit #0) allocated to a unit number 0 is repeated in every $N_T$ number of subframes. In embodiment of FIG. 16, a resource pool can be repeated with a period of the $N_T$ number of subframes. As shown in FIG. 16, a specific resource unit may periodically and repeatedly appear. Or, an index of a physical resource unit to which a logical resource unit is mapped may change according to a predetermined pattern to obtain a diversity gain in time domain and/or frequency domain. For example, the logical resource unit can hop on time and/or frequency axis according to a predetermined pattern set to an actual physical resource unit. In FIG. 16, a resource pool may correspond to a set of resource units capable of being used by a UE intending to transmit a D2D signal.

The resource pool can be classified into various types. First of all, the resource pool can be classified according to contents of a D2D signal transmitted via each resource pool. For example, the contents of the D2D signal can be classified into various signals and a separate resource pool can be configured according to each of the contents.

Scheduling assignment (SA): The SA may correspond to a signal including information on a resource position of a D2D data channel, information on MCS (modulation and coding scheme) necessary for modulating and demodulating a data channel, information on a MIMO transmission scheme, and the like. SA information may include an identifier of a target UE to which data of each transmission UE is to be transmitted. A signal including the SA information can be transmitted on an identical resource unit in a manner of being multiplexed with D2D data. In this case, an SA resource pool may correspond to a pool of resources that SA and D2D data are transmitted in a manner of being multiplexed.

D2D data channel: The D2D data channel corresponds to a resource pool used by a transmission UE to transmit user data using a resource designated by the SA. If an SA signal and a D2D data channel are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool.

Discovery message: A discovery message resource pool corresponds to a resource pool for transmitting a discovery message that enables neighboring UEs to discover a transmission UE transmitting information such as ID of the UE, and the like.

As mentioned in the foregoing description, a D2D resource pool can also be classified according to content of a D2D signal. Yet, although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), and the like.

According to the aforementioned contents, a UE intending to transmit data via D2D selects an appropriate resource from an SA pool and transmits SA of the transmission UE. In this case, as a reference for selecting an SA resource pool, it may be able to preferentially select an SA resource interlocked with a resource that satisfies at least one of a resource not transmitting SA of a different UE and a resource which is expected not to transmit data in a following subframe according to SA of a different UE. In addition, the transmission UE may select an SA resource interlocked with a data transmission resource of which an interference level is expected to be low. And, the SA information can be broadcasted. In doing so, UEs belonging to a D2D communication system may receive the broadcasted SA information. In the following, 'transmitting' or 'sending' can be replaced with 'broadcasting'.

In the aforementioned D2D communication, the term 'D2D' can be replaced by 'sidelink'.

Figure 17:
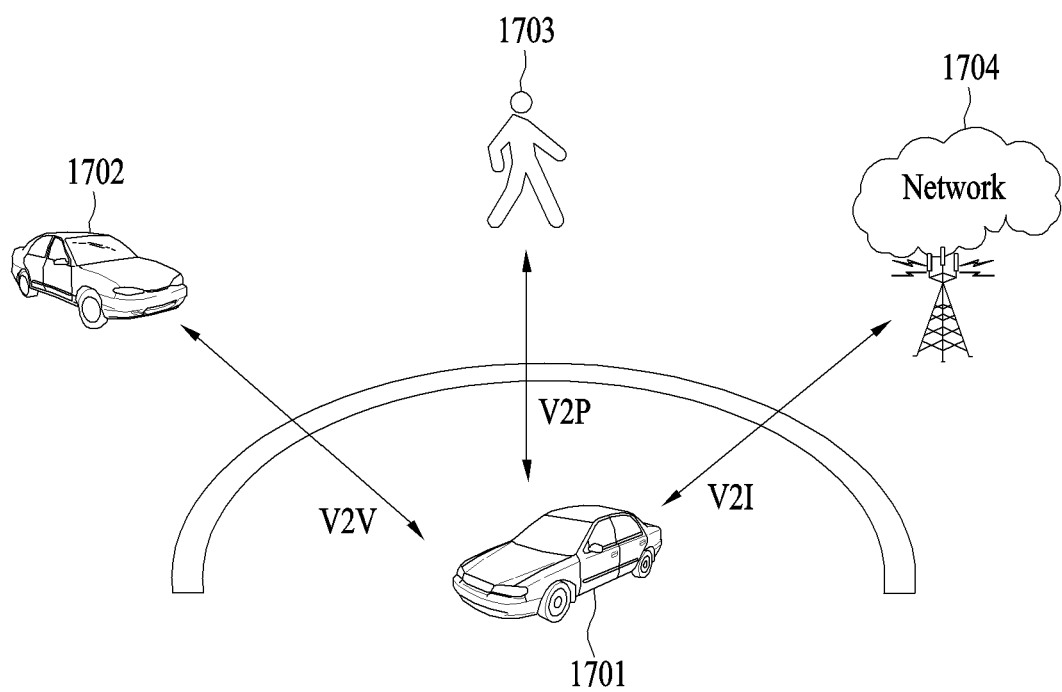
FIG. 17 is a schematic diagram showing a V2X communication network.

FIG. 17 is a schematic diagram showing a V2X communication network.

V2X communication may be categorized into V2V (vehicle-to-vehicle) communication, V2P (vehicle-to-pedestrian) communication, and V2I (vehicle-to-infrastructure entity) communication. V2V communication may refer to communication between vehicles 1001 and 1002. Traffic information and the like may be shared between the vehicles 1001 and 1002 through V2V communication. V2P communication may refer to communication between the vehicle 1001 and a device (e.g., a handheld terminal of a pedestrian or a bicycle rider) carried by a pedestrian 1003. Since the pedestrian 1003 can move along a sidewalk adjacent to a road as well, information on a danger on the road and the like may be shared through V2P communication. And, V2I communication may refer to communication between the vehicle and a roadside unit (RSU) 1004. The RSU 1004 may refer to a traffic infrastructure entity. For example, the RSU 1004 may include an entity that transmits a speed notification. For V2X communication, the vehicles 1001 and 1002, the RSU 1004 and the handheld device of the pedestrian 1003 may be equipped with transceivers. V2X communication may be implemented using a technology similar to D2D (device-to-device) communication of the communication standard of the 3GPP (3$^{rd}$ generation partnership project). And, V2X communication may be implemented using DSRC (dedicated short-range communication) technology of IEEE (institute of electrical and electronics engineers).

In case of performing V2X communication, UEs can be synchronized based on a satellite signal. For example, the UEs can be synchronized based on a GPS signal. And, the UEs can be synchronized based on a synchronization signal received from a base station or other UEs as well. For example, a pedestrian UE can transmit a message. And, a part of UEs among reception UEs can be synchronized with a transmission UE. And, another part of the UEs among the reception UEs may not be synchronized with the transmission UE. In this case, UEs, which are not synchronized with the transmission UE, may fail to receive a transmitted message. For example, the transmitted message may correspond to a message indicating urgent danger. Therefore, it is necessary to provide an appropriate synchronization signal to the reception UEs to enable all intended UEs to receive the message. For example, the reception UEs can be synchronized based on a synchronization signal transmitted by the transmission UE. And, the reception UEs can report the message received from the transmission UE based on the synchronization.

In the following, a method of transmitting a synchronization signal is explained according to embodiments of the present specification. Although the embodiments described in the following are explained centering on a V2X communication, the embodiments can also be applied to a different communication such as a D2D communication, and the like. In the following description, for clarity, a pedestrian UE and a vehicle UE can be referred to as a PUE (pedestrian-user equipment) and a VUE (vehicle-user equipment), respectively.

In V2X communication scenario, it may assume various types of message transmission. For example, a periodically transmitted message can be defined by various periods. And, a message transmission can be triggered based on an event. The message can be referred to as an event-triggered message. For example, a PUE can intermittently transmit a message. Since a pedestrian has a low moving speed, the PUE may intermittently transmit a message in response to an event. On the contrary, a VUE can transmit a message with a higher frequency compared to the PUE. Hence, it may be not necessary for the PUE to frequently transmit a synchronization signal. On the contrary, the VUE may be able to more frequently transmit a synchronization signal to guarantee reception of a message. In particular, a transmission frequency/period of a synchronization signal can be determined based on a message transmission frequency of a UE. And, a transmission frequency/period of a synchronization signal can be determined based on a type of a UE.

As mentioned in the foregoing description, transmission of a synchronization signal can be determined based on a frequency of a message transmitted by a UE. Meanwhile, the transmission of the synchronization signal can also be determined based on capability of the UE capable of transmitting the synchronization signal. For example, a PUE has limitative power. Hence, as a synchronization signal is more frequently transmitted, the power of the PUE can be more quickly consumed. On the other hand, a VUE has more power compared to the PUE. A UE may assume that the VUE has infinite power. This is because a generator of a vehicle provides power to the VUE as far as the vehicle operates. In particular, the PUE can transmit a synchronization signal with a higher frequency compared to the VUE.

As mentioned in the foregoing description, transmission of a synchronization signal can be determined based on a message transmission frequency, a UE type, and/or capability of a UE. In the following, a method of transmitting a synchronization signal is described according to embodiments of the present invention.

For example, a transmission method of a synchronization signal can be determined based on a type of a UE. For example, the type of the UE may indicate capability of the UE. The capability of the UE can include capability of a power source of the UE. For example, UEs can be classified into a UE having a power source capable of consistently supplying power and a UE having a power source capable of supporting power of a limited amount.

For example, a VUE or an RSU (road side UE) can be connected to a power source capable of consistently supplying power. And, the VUE and/or the RSU can be connected with a power source capable of supplying power more than predetermined time or a power source having power (or energy) equal to or greater than a predetermined amount. It may assume that the VUE or the RSU is connected with the power source having practically infinite power, the power source having power equal to or greater than the predetermined amount, the power source capable of supplying power more than predetermined time, or the power source capable of supplying power equal to or greater than the predetermined amount. In this case, the VUE or the RSU can be referred to as a UE having infinite power in the following description. The VUE or the RSU can be configured to periodically transmit a synchronization signal.

For example, a PUE or an RSU (road side UE) can be connected to a power source incapable of consistently supplying power. And, it may assume that the PUE or the RSU is connected with a power source having finite power, a power source having power less than a predetermined amount, a power source capable of supplying power less than predetermined time, or a handheld power source. In this case, the PUE or the RSU can be referred to as a UE having finite power. And, the UE having finite power can be configured to transmit a synchronization signal within a specific window on a time axis. And, the UE having finite power can be configured to periodically transmit a synchronization signal within a specific window. And, in the following embodiments, a window on a time axis can be referred to as a time interval.

For example, a UE can be configured to transmit a message rather than a synchronization signal. In this case, a window for transmitting a synchronization signal of a UE having finite power can be configured to have message transmission timing of the UE. For example, the UE may switch to a wakeup state from an idle state to transmit a message. In particular, if the window for transmitting a synchronization signal is configured to have transmission timing of a message, the UE can save power. For example, the UE may fail to transmit a message at the transmission timing of the message. In this case, retransmission timing of the message can be configured within a window for transmitting a synchronization signal. And, the window can be reconfigured to include the retransmission timing of the message. And, for example, a size or a start point of the window can be configured or preconfigured via higher layer signaling (e.g., RRC (radio resource control) signaling). And, as mentioned in the foregoing description, a synchronization signal can be periodically transmitted within the window. A transmission period of a synchronization signal can be configured or preconfigured via higher layer signaling (e.g., RRC (radio resource control) signaling).

And, the size of the window, the start point of the window, and/or the transmission period of the synchronization signal can be differently configured depending on a type of a message. The type of the message can be classified based on importance of the message, a priority of the message, a type of a target UE of the message, and/or a type of a UE transmitting the message. For example, a message of a first priority higher than a second priority has a window size greater than a window size of a message of the second priority. The message of the first priority may have a shorter transmission period. And, for example, a message targeting a VUE has a window size greater than a window size of a message targeting a PUE. The message targeting the VUE may have a shorter transmission period.

Meanwhile, although a message transmission is not scheduled, a UE may transmit a synchronization signal for UEs adjacent to the UE. For example, the UE may correspond to a UE which is synchronized based on a GPS, a base station, or a different reference. The synchronized UE may transmit a synchronization signal for other non-synchronized UEs.

As mentioned in the foregoing description, a UE transmitting a synchronization signal can transmit the synchronization signal based on a type of the UE. For example, a UE having infinite power can periodically transmit a synchronization signal. And, for example, a UE having finite power may periodically transmit a synchronization signal within a specific window only.

When a UE does not transmit a message but transmit a synchronization signal, the UE may be able to receive a message. For example, a window for transmitting a synchronization signal can be configured based on reception timing of a message. For example, the window can be configured to include the reception timing of the message. For example, a UE can switch to a wakeup state from an idle state to receive a message. In particular, if a window for transmitting a synchronization signal is configured to have reception timing of a message, the UE can save power. For example, the UE can receive a message at predetermined timing. For example, if the UE fails to receive a message or fails to decode a message, the UE may stop transmitting a synchronization signal or may not start to transmit a synchronization signal. And, if the window is configured to have reception timing of a message, for example, a size of the window or start timing of the window can be configured or preconfigured via higher layer signaling (e.g., RRC (radio resource control) signaling). And, as mentioned in the foregoing description, a synchronization signal can be periodically transmitted within the window. A transmission period of the synchronization signal can be configured or preconfigured via higher layer signaling (e.g., RRC (radio resource control) signaling).

And, the size of the window, the start point of the window, and/or the transmission period of the synchronization signal can be differently configured depending on a type of a reception message. The type of the message can be classified based on importance of the message, a priority of the message, a type of a target UE of the message, and/or a type of a UE transmitting the message. For example, a message of a first priority higher than a second priority has a window size greater than a window size of a message of the second priority. The message of the first priority may have a shorter transmission period. And, for example, a message targeting a VUE has a window size greater than a window size of a message targeting a PUE. The message targeting the VUE may have a shorter transmission period.

And, UEs may alternately transmit a synchronization signal to save power. For example, UEs having finite power can be configured to alternately transmit a synchronization signal.

For example, a UE can transmit a synchronization signal based on the number of receiving a message or the number of successfully receiving a message. For example, assume that the number of receiving a message or the number of successfully receiving a message received by a UE corresponds to k (k is a natural number). For example, the UE can transmit a synchronization signal when k mod N (N is a natural number) satisfies a specific value. And, the N and the specific value can be configured by a value configured or preconfigured via higher layer signaling (e.g., RRC signaling). For example, the N and the specific value may correspond to 4 and 0, respectively. In this case, whenever a message is (successfully) received by a multiple of 4, the UE can transmit a synchronization signal.

And, for example, a UE can transmit a synchronization signal based on a probability. For example, when the UE receives a message or when the UE successfully receives a message, the UE can determine whether to transmit a synchronization signal based on a probability P. A value of the probability P can be configured by a value configured or preconfigured via higher layer signaling (e.g., RRC signaling). And, the value of the probability P can be included in the received message.

As mentioned in the foregoing description, when a UE determines whether to transmit a synchronization signal at the time of receiving a message, the UE can periodically transmit the synchronization signal within a predetermined window. As mentioned in the foregoing description, a size of the window and/or a period of transmitting the synchronization signal can be configured in advance or can be configured via higher layer signaling. And, as mentioned in the foregoing description, a size of the window, a start point of the window, and/or a period of transmitting the synchronization signal can be differently configured according to a type of a message.

Figure 18A:
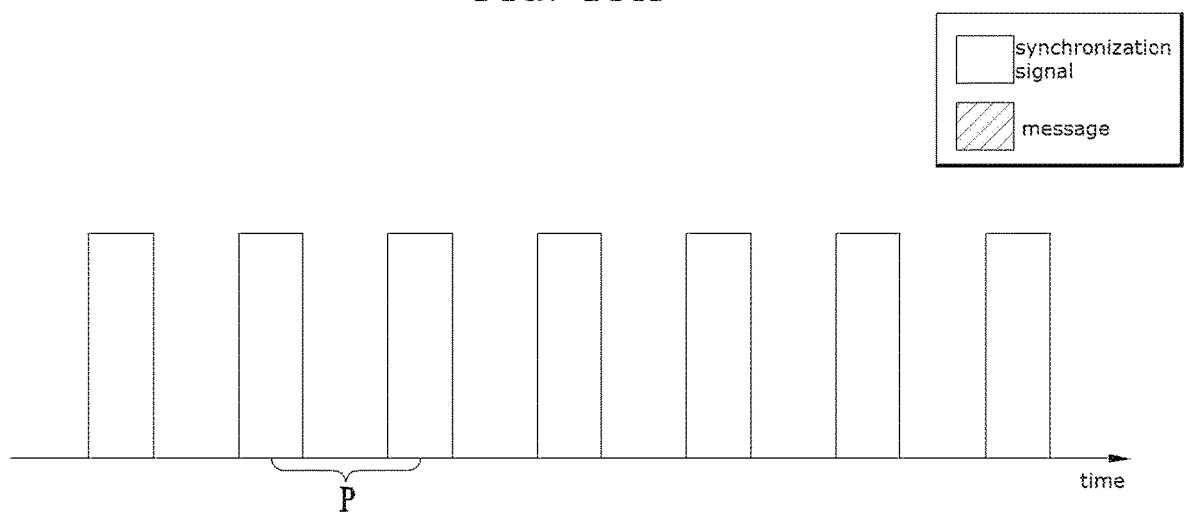
FIG. 18a illustrates a method of transmitting a synchronization signal according to one embodiment of the present invention.

FIG. 18a illustrates a method of transmitting a synchronization signal according to one embodiment of the present invention.

As mentioned in the foregoing description, a UE can periodically transmit a synchronization signal. For example, the UE may correspond to a UE having infinite power. As shown in FIG. 18a, the UE may transmit a synchronization signal according to a first period (P). A period for transmitting a synchronization signal can be configured or preconfigured via higher layer signaling (e.g., RRC signaling). As mentioned in the foregoing description, a UE (e.g., VUE or RSU), which is connected with a power source capable of consistently supplying power, can periodically transmit a synchronization signal. And, the UE may correspond to a UE scheduled to transmit a message. And, the UE may correspond to a UE synchronized with a GPS, a base station, or a different synchronization source.

Figure 18B:
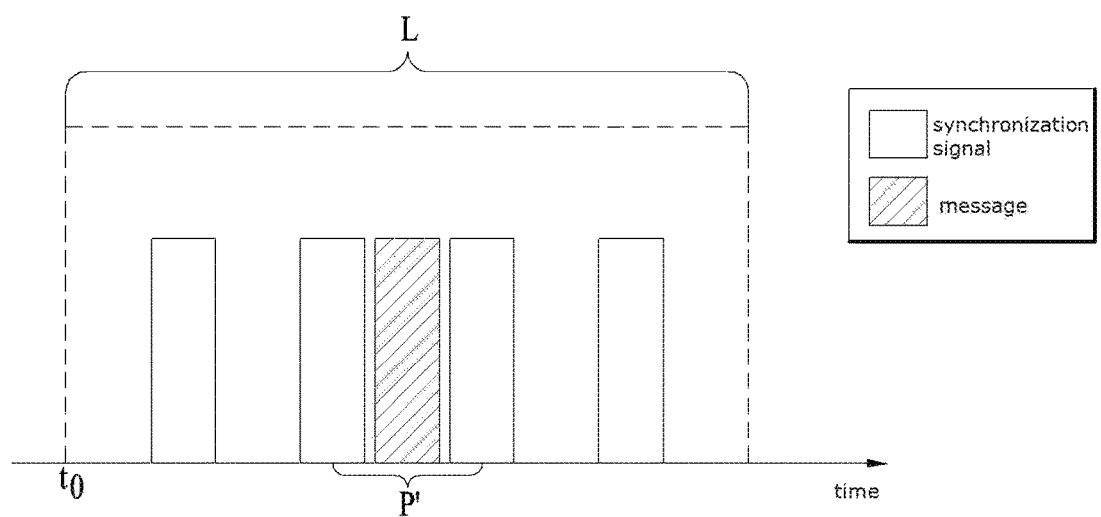
FIG. 18b illustrates a method of transmitting a synchronization signal according to a different embodiment of the present invention.

FIG. 18b illustrates a method of transmitting a synchronization signal according to a different embodiment of the present invention.

As mentioned in the foregoing description, a UE can periodically transmit a synchronization signal within a specific window. For example, the UE may correspond to a UE having finite power. As shown in FIG. 18b, the UE can transmit a synchronization signal according to a second period (P'). A period for transmitting a synchronization signal can be configured or preconfigured via higher layer signaling (e.g., RRC signaling). And, for example, the window can be configured to have transmission timing or retransmission timing of a message. And, for example, the window can be configured to have reception timing of a message. A start point (t0) of the window and/or a length (L) of the window can be configured or preconfigured via higher layer signaling (e.g., RRC signaling). As mentioned in the foregoing description, the start point of the window, the length of the window, the period for transmitting a synchronization signal can be differently configured according to a type of a message. Meanwhile, the window shown in FIG. 18b can also be configured based on the number of receiving a message. And, as mentioned in the foregoing description, the window can be configured based on a probability which is preconfigured at the time of receiving a message.

In FIG. 18b, a synchronization signal is periodically transmitted within a window. Yet, in order to save power, a UE may transmit the synchronization signal more than one time at the time of receiving a message. For example, the UE may transmit a synchronization signal only when a message is received. And, the UE can determine whether to transmit a message according to a predetermined rule. And, the UE can determine whether to transmit a message based on a predetermined probability at the time of receiving a message.

Figure 19A:
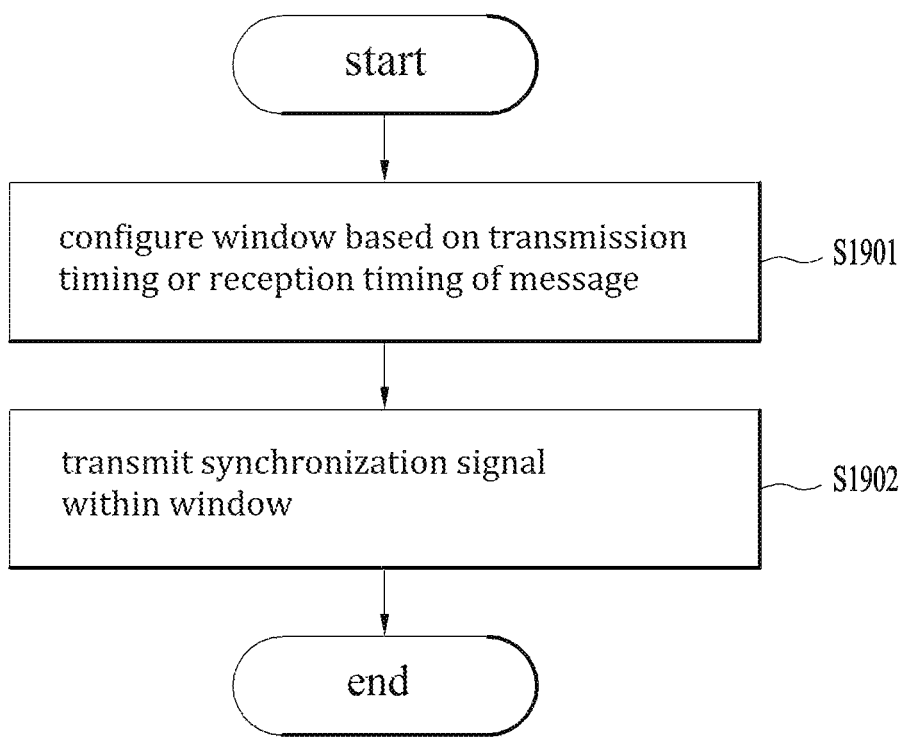
FIG. 19a is a flowchart illustrating a method of transmitting a synchronization signal according to one embodiment of the present invention.

FIG. 19a is a flowchart illustrating a method of transmitting a synchronization signal according to one embodiment of the present invention.

Although it is not depicted in FIG. 19a, a UE can determine a method of transmitting a synchronization signal based on a type of the UE. For example, the type of the UE can include a first type UE and a second type UE. For example, the type of the UE can be determined based on power capability of the UE. For example, if a UE is connected with a power source capable of consistently supplying power, the UE can be classified as the first type UE. The first type UE may consistently transmit a synchronization signal. And, if a UE is connected with a power source having limited power only, the UE can be classified as the second type UE. The second type UE can be configured to transmit a synchronization signal within a window on a time axis only. For example, the first type UE may correspond to a VUE. And, the second type UE may correspond to a PUE.

If the UE determines to transmit a synchronization signal within a specific window, the UE can configure the window based on transmission timing or reception timing of a message [S1901]. For example, the UE can configure the window to include the transmission timing or the reception timing of the message. And, the UE can transmit a synchronization signal within the window [S1902]. For example, the UE can periodically transmit the synchronization signal. A period for transmitting the synchronization signal can be configured in advance or can be configured via higher layer signaling. And, a size of the window and/or a start point of the window can be configured in advance or can be configured via higher layer signaling. And, as mentioned in the foregoing description, the size of the window, the start point of the window, and/or the period for transmitting the synchronization signal can be determined based on a type of a message. For example, the type of the message can include a type of a transmission UE, a type of a target UE, and/or a priority of a message, and the like.

Figure 19B:
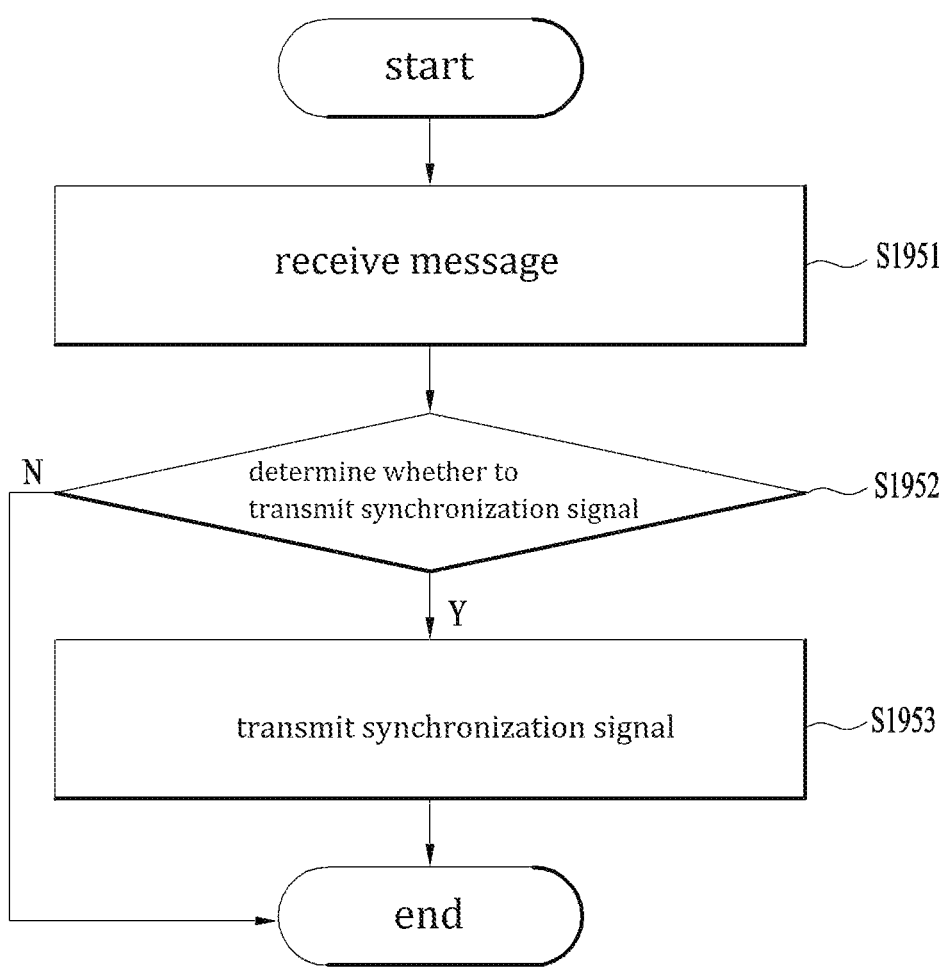
FIG. 19b is a flowchart illustrating a method of transmitting a synchronization signal according to a different embodiment of the present invention.

FIG. 19b is a flowchart illustrating a method of transmitting a synchronization signal according to a different embodiment of the present invention.

Although it is not depicted in FIG. 19a, a UE can determine a method of transmitting a synchronization signal based on a type of the UE. For example, the type of the UE can include a first type UE and a second type UE. For example, the type of the UE can be determined based on power capability of the UE. For example, if a UE is connected with a power source capable of consistently supplying power, the UE can be classified as the first type UE. The first type UE may consistently transmit a synchronization signal. And, if a UE is connected with a power source having limited power only, the UE can be classified as the second type UE. As shown in FIG. 19b, the second type UE can be configured to transmit a synchronization signal. For example, the first type UE may correspond to a VUE. And, the second type UE may correspond to a PUE.

A UE can receive a message [S1951]. Having received the message, the UE can determine whether to transmit a synchronization signal in response to the reception of the message [S1952]. For example, the UE can determine whether to transmit the synchronization signal based on a probability configured in advance or a probability configured via higher layer signaling. And, for example, as mentioned in the foregoing description, the UE can determine whether to transmit the synchronization signal based on a predetermined rule.

Figure 20:
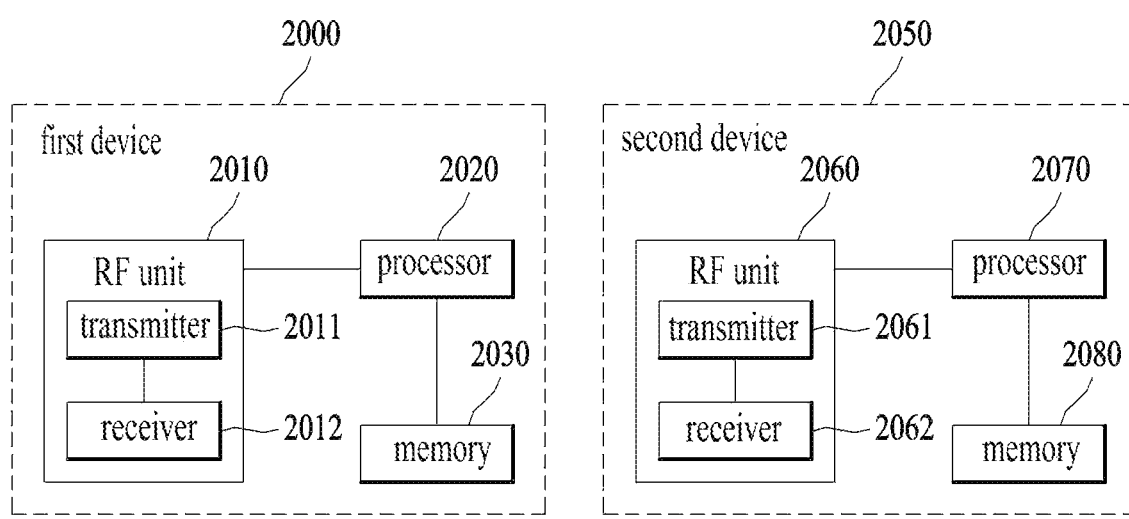
FIG. 20 is a schematic diagram illustrating devices according to an embodiment of the present invention.

If the UE determines to transmit the synchronization signal, the UE can transmit the synchronization signal [S1953]. The transmission of the synchronization signal can include transmission of a synchronization signal periodically transmitted within a window. For example, if the UE determines to transmit the synchronization signal, the UE can start the window. And, the UE can transmit the synchronization signal within the window according to a predetermined period. In this case, a size of the window, a period for transmitting the synchronization signal, and the like can be configured in advance or can be configured via higher layer signaling. And, as mentioned in the foregoing description, the size of the window, the period for transmitting the synchronization signal, and the like can be determined based on a type of a message. For example, the type of the message can include a type of a transmission UE, a type of a target UE, and/or a priority of a message, and the like. FIG. 20 is a schematic diagram illustrating devices to which the embodiments of the present invention mentioned earlier in FIGS. 1 to 19 are applicable according to an embodiment of the present invention.

In FIG. 20, each of a first device 2000 and a second device 2050, which are D2D UEs, includes a radio frequency (RF) unit 2010, 2060, a processor 2020, 2070, and, optionally, a memory 2030, 2080. Although FIG. 20 shows configuration of two D2D UEs, a plurality of D2D UEs may establish a D2D communication environment.

Each of the RF unit 2030 and 2060 may include a transmitter 2011, 2061 and a receiver 2012, 2062. The transmitter 2011 and the receiver 2012 of the first device 2000 may be configured to transmit and receive signals to and from the second device 2050 and other D2D UEs, and the processor 2020 may be functionally connected to the transmitter 2011 and the receiver 2012 to control the transmitter 2011 and the receiver 2012 to transmit and receive signals to and from other devices. Meanwhile, the first device 2000 and/or the second device 2050 may be an eNB.

The processor 2020 may perform various kinds of processing on a signal to be transmitted, and then transmit the signal to the transmitter 2011, and process a signal received by the receiver 2012. If necessary, the processor 2020 may store, in the memory 2030, information contained in an exchanged message.

With the above-described structure, the first device 2000 may perform the methods of the various embodiments of the present invention described above. For example, each signal and/or message may be transmitted and received using a transmitter and/or receiver of the RF unit, and each operation may be performed under control of the processor.

Meanwhile, although not shown in FIG. 20, the first device 2000 may include various additional elements according to device application type. For example, if the first device 2000 is for intelligent metering, the first device 2000 may include an additional element for power measurement and the like. The operation of power measurement may be under control of the processor 2020 or a separately configured processor (not shown).

For example, the second device 2050 may be an eNB. In this case, the transmitter 2061 and receiver 2062 of the eNB may be configured to transmit and receive signals to and from other eNBs, D2D servers, D2D devices, and the processor 2070 may be functionally connected to the transmitter 2061 and receiver 2062 and may be configured to control the process of the transmitter 2061 and the receiver 2062 transmitting and receiving signals to and from other devices. In addition, the processor 2070 may perform various kinds of processing on a signal to be transmitted, transmit the signal to the transmitter 2061, and process a signal received by the receiver 2062. If necessary, the processor 2070 may store, in the memory 2030, information contained in an exchanged message. With the above-described structure, the eNB 2050 may perform the methods of the various embodiments described above.

In FIG. 20, the processors 2020 and 2070 of the first device 2010 and the second device 2050 respectively instruct operations for the first device 2010 and the second device 2050 (for example, control, adjustment, management, etc.). Each of the processors 2020 and 2070 may be connected to the memory 2030, 2080 that stores program code and data. The memories 2030 and 2080 may be connected to the processors 2020 and 2070 to store operating systems, applications, and general files.

The processors 2020 and 2070 of the present invention may be referred to as a controller, a microcontroller, a microprocessor, a microcomputer, or the like. Meanwhile, the processors 2020 and 2070 may be implemented by hardware, firmware, software, or a combination thereof. When embodiments of the present invention are implemented using hardware, the processors 2020 and 2070 may include application specific integrated circuits (ASICs), digital signal processors (DSPs), digital signal processing devices (DSPDs), programmable logic devices (PLDs), or field programmable gate arrays (FPGAs).

When embodiments of the present invention are implemented using firmware or software, the firmware or software may be configured to include modules, procedures, or functions that perform the functions or operations of the present invention. The firmware or software configured to implement the present invention may be provided within the processor or may be stored in the memory and driven by the processor.

The embodiments described above are constructed by combining elements and features of the present invention in a predetermined form. Each element or feature should be understood as optional unless explicitly mentioned otherwise. Each of the elements or features can be implemented without being combined with other elements. In addition, some elements and/or features may be combined to configure an embodiment of the present invention. The sequence of operations discussed in the embodiments of the present invention may be changed. Some elements or features of one embodiment may also be included in another embodiment, or may be replaced by corresponding elements or features of another embodiment. Claims that are not explicitly cited in each other in the appended claims may be combined to establish an embodiment of the present invention or be included in a new claim by subsequent amendment after the application is filed.

The present invention may be embodied in specific forms other than those set forth herein without departing from the spirit and essential characteristics of the present invention. Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein.

INDUSTRIAL APPLICABILITY

The aforementioned embodiments of the present invention can be applied to various mobile communication systems.

What is claimed is:

1. A method of transmitting a synchronization signal by a user equipment (UE) for vehicle-to-something (V2X) communication in a wireless communication system, the method comprising:
   configuring one of a first UE type and a second UE type, based on a power capability of the UE;
   transmitting the synchronization signal based on a first period when the UE is configured to the first UE type; and
   transmitting the synchronization signal within a window on a time axis based on a number of times of message reception, when the UE is configured to the second UE type,
   wherein the first UE type is for a UE contained in a vehicle,
   wherein the second UE type is for a handheld UE,
   wherein the synchronization signal of the UE configured to the second UE type is transmitted when the number of times of the message reception is a multiple of a predetermined value configured by higher layer signaling, and
   wherein when a plurality of UEs including the UE are configured to the second UE type and to transmit a synchronization signal, each synchronization signal of the plurality of UEs is alternately transmitted.

2. The method of claim 1, wherein the window is configured to include a timing for reception or transmission of a message of the UE.

3. The method of claim 2, wherein at least one selected from a group including a size of the window, a start point of the window, and the first period is configured by higher layer signaling.

4. The method of claim 2, wherein a size of the window is configured based on at least one selected from a group including a type of the UE, a type of a target UE of the message, and a priority of the message.

5. The method of claim 1, wherein the UE is synchronized based on a global positioning system (GPS) or signaling from a base station.

6. A user equipment (UE) transmitting a synchronization signal for vehicle-to-something (V2X) communication in a wireless communication system, the UE comprising:
   a transceiver configured to transmit and receive a radio signal; and
   at least one processor configured to control the transceiver,
   wherein the at least one processor is configured to:
   configure one of a first UE type and a second UE type, based on a power capability of the UE,
   transmit the synchronization signal according to a first period when the UE is configured to the UE type,
   transmit the synchronization signal within a window on a time axis based on a number of times of message reception, when the UE is configured to the second UE type,
   wherein the first UE type is for a UE contained in a vehicle,
   wherein the second UE type is for a handheld UE,
   wherein the synchronization signal of the UE configured to the second UE type is transmitted when the number of times of the message reception is a multiple of a predetermined value configured by higher layer signaling, and
   wherein when a plurality of UEs including the UE are configured to the second UE type and to transmit a synchronization signal, each synchronization signal of the plurality of UEs is alternately transmitted.

7. The UE of claim 6, wherein the window is configured to include a timing for reception or transmission of a message of the UE.

8. The UE of claim 7, wherein a size of the window is configured based on at least one selected from a group including a type of the UE, a type of a target UE of the message, and a priority of the message.

9. The UE of claim 7, wherein at least one selected from a group including a size of the window, a start point of the window, and the first period is configured by higher layer signaling.

10. The UE of claim 6, wherein the UE is synchronized based on a global positioning system (GPS) or signaling from a base station.

* * * * *